United States Patent [19]
Preston et al.

[11] Patent Number: 6,144,336
[45] Date of Patent: Nov. 7, 2000

[54] SYSTEM AND METHOD TO COMMUNICATE TIME STAMPED, 3-AXIS GEO-POSITION DATA WITHIN TELECOMMUNICATION NETWORKS

[75] Inventors: Dan A. Preston, Bainbridge Island; Joseph D. Preston, Seattle; James Vroman, Vancouver, all of Wash.

[73] Assignee: Integrated Data Communications, Inc., Bainbridge Island, Wash.

[21] Appl. No.: 09/230,079

[22] PCT Filed: May 19, 1998

[86] PCT No.: PCT/US98/10317

§ 371 Date: May 13, 1999

§ 102(e) Date: May 13, 1999

[87] PCT Pub. No.: WO98/53573

PCT Pub. Date: Nov. 26, 1998

Related U.S. Application Data

[60] Provisional application No. 60/047,034, May 19, 1997, provisional application No. 60/047,140, May 20, 1997, provisional application No. 60/048,385, Jun. 3, 1997, provisional application No. 60/048,369, Jun. 3, 1997, and provisional application No. 60/055,497, Aug. 12, 1997.

[51] Int. Cl.[7] .................................................. H04B 7/26
[52] U.S. Cl. ...................... 342/357.09; 455/426; 455/456
[58] Field of Search ......................... 342/357.06, 357.07, 342/357.09, 357.1; 379/50, 59; 455/521, 426, 456; 375/222

[56] References Cited

U.S. PATENT DOCUMENTS

| Re. 35,498 | 4/1997  | Barnard .................................. | 342/357 |
| Re. 35,916 | 10/1998 | Dennison et al. ...................... | 455/456 |
| D. 395,250 | 6/1998  | Kabler et al. ........................... | D10/65  |
| 4,914,651  | 4/1990  | Lusignan ................................. | 370/59  |
| 5,043,736  | 8/1991  | Darnell et al. .......................... | 342/357 |
| 5,218,618  | 6/1993  | Sagey ..................................... | 342/457 |

(List continued on next page.)

FOREIGN PATENT DOCUMENTS

| 242 099      | 10/1987 | European Pat. Off. .......... | G01S 5/14 |
| 0 528 090 A1 | 8/1991  | European Pat. Off. .......... | G01S 5/00 |
| 44 24 412 A 1| 1/1996  | Germany ......................... | H04B 7/26 |
| 89 12835     | 12/1989 | WIPO ............................... | G01S 5/02 |
| WO 89/12835  | 12/1989 | WIPO ............................... | G01S 5/02 |
| WO 95/21511  | 8/1995  | WIPO ............................... | H04Q 7/34 |

(List continued on next page.)

OTHER PUBLICATIONS

Brown et al, "A Reconfigurable Modem for Increased Network Capacity and Video, Vooice, and Data Transmission over GSM PCS", IEEE Trans. on Circuits and Systems for Video Technolocy, vol. 6, No. 2, Apr. 1996, pp. 215–224.

Feher, Kamilo, "MODEMS for Emerging Digital Cellular–Mobile Radio System", IEEE Trans. on Vehicular Technology, vol. 40, No. 2, May 1991, pp. 355–365.

*Primary Examiner*—Gregory C. Issing
*Attorney, Agent, or Firm*—Stoel Rives LLP

[57] ABSTRACT

In the case of a conventional radio telecommunication system for transmitting information between stationary transmitting/receiving units and mobile transmitting/receiving units it is proposed that the mobile units be additionally provided with a satellite navigation receiver for independently determining a position rough value. The stationary units are likewise provided with a satellite navigation receiver for independently determining a reference position rough value of a reference location of known exact geographical position as the reference position normal value, and with an error detection unit for detecting position determination errors by comparing the instantaneously determined reference position rough value with the reference position normal value. In the mobile units or in the stationary units, correction of the position rough values is then carried out with determination errors determined substantially isochronously, the required transmission of the position rough values and the position determination errors being carried out by radio over the radio channel used for the speech information.

20 Claims, 20 Drawing Sheets

U.S. PATENT DOCUMENTS

| | | | |
|---|---|---|---|
| 5,223,844 | 6/1993 | Mansell et al. | 342/357 |
| 5,235,633 | 8/1993 | Dennison et al. | 379/60 |
| 5,388,147 | 2/1995 | Grimes | 379/59 |
| 5,388,247 | 2/1995 | Grimes | 379/59 |
| 5,389,934 | 2/1995 | Kass | 342/357 |
| 5,396,539 | 3/1995 | Slekys et al. | 379/59 |
| 5,410,739 | 4/1995 | Hart | 455/66 |
| 5,414,432 | 5/1995 | Penny, Jr. et al. | 342/357 |
| 5,418,537 | 5/1995 | Bird | 342/357 |
| 5,422,816 | 6/1995 | Sprague et al. | 364/449 |
| 5,459,469 | 10/1995 | Schuchman et al. | 342/37 |
| 5,479,482 | 12/1995 | Grimes | 379/59 |
| 5,513,111 | 4/1996 | Wortham | 364/460 |
| 5,519,403 | 5/1996 | Bickley et al. | 342/352 |
| 5,519,621 | 5/1996 | Wortham | 364/460 |
| 5,539,810 | 7/1996 | Kennedy, III et al. | 379/59 |
| 5,544,225 | 8/1996 | Kennedy, III et al. | 379/59 |
| 5,546,445 | 8/1996 | Dennison et al. | 379/60 |
| 5,555,286 | 9/1996 | Tendler | 379/59 |
| 5,572,204 | 11/1996 | Timm et al. | 340/988 |
| 5,587,715 | 12/1996 | Lewis | 342/357 |
| 5,594,425 | 1/1997 | Ladner et al. | 340/825.06 |
| 5,625,668 | 4/1997 | Loomis et al. | 379/58 |
| 5,630,206 | 5/1997 | Urban et al. | 455/54.1 |
| 5,650,770 | 7/1997 | Schlager et al. | 340/573 |
| 5,663,734 | 9/1997 | Krasner | 342/357 |
| 5,673,305 | 9/1997 | Ross | 379/58 |
| 5,686,910 | 11/1997 | Timm et al. | 340/988 |
| 5,687,215 | 11/1997 | Timm et al. | 379/58 |
| 5,703,598 | 12/1997 | Emmons | 342/357 |
| 5,712,619 | 1/1998 | Simkin | 340/539 |
| 5,712,899 | 1/1998 | Pace, II | 379/58 |
| 5,724,243 | 3/1998 | Westerlage et al. | 364/446 |
| 5,726,893 | 3/1998 | Schuchman et al. | 364/449.7 |
| 5,731,757 | 3/1998 | Layson, Jr. | 340/573 |
| 5,761,204 | 6/1998 | Grob et al. | 370/467 |
| 5,771,455 | 6/1998 | Kennedy, III et al. | 455/456 |
| 5,781,156 | 7/1998 | Krasner | 342/357 |
| 5,786,789 | 7/1998 | Janky | 342/357 |
| 5,797,091 | 8/1998 | Clisel et al. | 455/404 |
| 5,812,087 | 9/1998 | Krasner | 342/357 |
| 5,825,327 | 10/1998 | Krasner | 342/357 |
| 5,831,574 | 11/1998 | Krasner | 342/357 |
| 5,832,394 | 11/1998 | Wortham | 701/1 |
| 5,835,907 | 11/1998 | Newman | 707/10 |
| 5,838,237 | 11/1998 | Revell et al. | 340/573 |
| 5,841,396 | 11/1998 | Krasner | 342/357 |
| 5,874,914 | 2/1999 | Krasner | 342/357 |
| 5,884,214 | 3/1999 | Krasner | 701/207 |
| 5,918,180 | 6/1999 | Dimino | 455/456 |
| 5,945,944 | 8/1999 | Krasner | 342/357 |
| 5,978,676 | 11/1999 | Guidri et al. | 455/426 |
| 5,999,124 | 12/1999 | Sheynblat | 342/357 |
| 6,002,363 | 12/1999 | Krasner | 342/357 |
| 6,014,089 | 1/2000 | Tracy et al. | 340/870.02 |

FOREIGN PATENT DOCUMENTS

| | | | |
|---|---|---|---|
| WO 96/15636 | 5/1996 | WIPO | H04Q 7/00 |
| WO 96/18275 | 6/1996 | WIPO | H04Q 7/32 |
| WO 99/36795 | 7/1999 | WIPO | G01S 5/14 |
| WO 99/56143 | 11/1999 | WIPO | G01S 5/14 |
| WO 99/56144 | 11/1999 | WIPO | G01S 5/14 |
| WO 98/59257 | 12/1999 | WIPO | G01S 1/04 |

FIG. 9

| Table 12 DTMF Frequencies | | |
|---|---|---|
| Signal | Low frequency | High frequency |
| 0 | 941 | 1336 |
| 1 | 697 | 1209 |
| 2 | 697 | 1336 |
| 3 | 697 | 1477 |
| 4 | 770 | 1209 |
| 5 | 770 | 1336 |
| 6 | 770 | 1447 |
| 7 | 852 | 1209 |
| 8 | 852 | 1336 |
| 9 | 852 | 1447 |
| * | 941 | 1209 |
| # | 941 | 1447 |
| A | 697 | 1633 |
| B | 770 | 1633 |
| C | 852 | 1633 |
| D | 941 | 1633 |

SYSTEM AND METHOD TO COMMUNICATE TIME STAMPED, 3-AXIS GEO-POSITION DATA WITHIN TELECOMMUNICATION NETWORKS

This application claims benefit of application Ser. Nos. 60/047,034 May 19, 1997, 60/047,140 May 20, 1997, 60/048,385, Jun. 3, 1997, 60/048,369, Jun. 3, 1997 and 60/055,497, Aug. 12, 1997. This application is also a 371 of PCT/US98/10317 filed May 19, 1998.

FIELD OF THE INVENTION

The present invention pertains to telecommunication technology and particularly includes improved systems and methodologies to communicate geo-position data representative of a present location of a remote communication apparatus, through the audio (voice) traffic channel of a telecommunication network, for example to a Public Safety Answering Point (PSAP) like the U.S. 911 PSAPs.

BACKGROUND OF THE INVENTION

Vice-president Al Gore recently announced development of additional civilian signals to be provided by the satellite-based U.S. Global Positioning System (GPS). "The additional civilian signals will significantly improve navigation, positioning and timing services to millions of users worldwide—from backpackers and boaters to farmers and fishermen, from airline pilots to telecommunications provider, and from scientists to surveyors." Vice president Gore said. "GPS has become an engine of economic growth and efficiency as businesses and consumers are continually developing new and creative applications of the system." Indeed, applications of the GPS and other satellite-based positioning systems are evolving rapidly for commercial, public safety and national security purposes.

Public safety can benefit tremendously from application of global locating technology, if it can be done reliably, accurately and economically. Cell telephones are becoming ubiquitous in the U.S. and around the globe, giving users the ability to place a call, in particular an emergency call, from almost anywhere at any time. The difficulty is that it is difficult to determine the location of the mobile caller. For a fixed location or "landline" telephone, the technology to trace the call back to the telephone location is already in place. It is more difficult to locate a mobile caller, yet the need is exploding.

In Massachusetts alone, for example, there are reportedly 40,000 cellular 911 calls per month placed to the PSAP (Public Safety Access Point) in Framingham which is the point from which all cellular 911 calls are routed. According to the CTIA (Cellular Telecommunications Institute of America), in 1997 there were in excess of 18 million cellular 911 calls placed in the U.S. The problem of identifying the location of emergency 911 callers is exacerbated by the fact that the individual may not be conscious, may not speak the English language, may be too hysterical to give adequate information to the dispatchers, or more likely, does not know where he/she is. In a panic situation, most 911 callers have not a clue as to where they are.

The U.S. government has issued a challenge to the communications industry to fix the problem. The FCC presently requires that wireless carriers must locate a 911 call by cell sector. A more recent FCC Report and Order (see Docket Number 94-102; 96-264) requires that by 2001, covered carriers must have the capability to identify the latitude and longitude of a mobile unit making a 911 call within a radius of no more than 125 meters in 67% of all cases. Even greater accuracy will of course provide that much more benefit. For example, finding an injured person in a crowded urban center may be difficult—and delayed—where the location information is off by 100 meters. A "fix" within a few meters would be more useful.

Various methods to locate a caller or mobile unit, at least approximately, are known. In one commercial example, The Code Alarm Company of Madison Heights, Mich. offered a system in which a dedicated cellular phone was provided with a LORAN receiver and a separate LORAN antenna, with the result information being modemed to a central dispatch office in Wisconsin. This system was not well received because of costs that involved the payment for a dedicated cellular phone, the provision of a separate long whip LORAN antenna, and the fact that the calls were modemed to a central processing point from which services were to be dispatched. The utilization of a central processing office suffered from the problem of "no local knowledge" in which knowledge of local streets and terrain as well as local emergency services was lacking. That system is not a practical solution to meeting the FCC challenge.

Another known approach to determine the location of a cell phone user is triangulation. In a triangulation system, the cellular phone location was identified through a ranging technique and a transponder at the cell phone. This also requires special equipment at every cell tower. The estimated implementation cost of $500K per cell site, along with a deployment time of approximately two years per community, make triangulation relatively expensive and neither universal nor quickly implementable. It is also doubtful that triangulation would reliably provide sufficient accuracy of reported location.

Others have tried a time difference of arrival (TDOA) technique in which a data burst is received simultaneously at three cell sites. From the time difference of arrival of the data burst from the phone at each of the cell sites, the approximate location of the cellular telephone can be determined. The approximate cost of the one such system is $90K per cell site and again this approach can take at least two years per community to implement.

Another vendor called the Associated Group has implemented a TDOA system, dubbed their True Position System. This system is undergoing testing to ascertain location accuracy and cost of implementation. The estimated cost is reportedly $50K per cell site, but varies depending on the number of receivers (1–6) per cell site. As with any triangulation system, when the cell sites are in line, the lines between the towers and the cell phone come together at very shallow angles, reducing the accuracy with which position can be ascertained. Secondly, as with all triangulation systems, the coverage depends on towers being retrofitted with suitable antennas and infrastructure. These types of solutions would cost literally billions of dollars to implement throughout the U.S. Moreover, the ability of triangulation systems to locate any cell phone—requested by the user or not—has civil liberty implications.

Many believe that GPS rather than terrestrial triangulation holds the key to fast, accurate location of a user. In order for GPS receivers to operate, the 40 watt spread spectrum signals from the 26 satellites must be receivable by the GPS receiver on a line-of-sight basis. It has been found that cloud cover, trees, and other blocking artifacts other than buildings seem to have very little effect on the receipt of these signals which are 20 dB down by the time they reach the earth's surface. In general, as many as 8–12 GPS satellites are "visible" from any particular point on the earth, with the result that manufacturers such as Motorola, Garmin, Trimnble, Magellan, Rockwell, and others have provided 8–12 channel receivers for the receipt of the GPS signals. The satellites provide signals indicating their own position, e.g., ephemeris, and timing signals such that the GPS receivers can derive range to each of these satellites, from which the position is internally calculated by the GPS receiver. Various hand-held GPS receivers for consumers, and GPS receiver integrated circuits and boards for OEM use, are commercially available.

One early system utilizing GPS information to provide a PSAP with the location of a stricken vehicle was developed by Navsys Corporation of Boulder Colorado in which raw GPS data received by a GPS antenna mounted on the exterior of a car was transmitted to a central processing point provided by Navsys and the Department of Transportation for the State of Colorado to process the GPS information and to provide location to ISAP terminals within the State of Colorado. While the utilization of GPS-based location information proved adequate to locate the vehicles in question, the utilization of a central processing facility to process raw GPS data was found to be unwieldy, also limiting the portability of the system to other jurisdictions. U.S. Pat. No. 5,712,899 to Pace, II shows a mobile location reporting system that utilizes a cell phone and GPS data apparently much like the Navsys system; GPS data is transmitted to a base station, and there decoded to form latitude and longitude location information.

As reported by Tendler Cellular of Boston, Motorola developed the Encore system for the location of vehicles initially implementing the system in Lincoln automobiles. These systems were implemented through the utilization of a cellular phone coupled to the output of the Encore 8-channel GPS receiver, with the latitude and longitude location being modemed to Westinghouse in Irving, Texas for further dissemination to the closest PSAP to the vehicle. The system was initially configured to provide the PSAP with the Vehicle Identification Number and position information only, with this information provided to the relevant PSAP by calling a back line at the PSAP.

In an effort to ascertain back-up line telephone numbers, Westinghouse turned to the National Emergency Number Association or NENA for the provision of the telephone anumbers of the local PSAPS. Presently, the accuracy of such PSAP numbers is at the 80% level, as there are some 7,000 PSAPS in the United States. The utility of modeming information to a central processing dispatch center such that as maintained by Westinghouse is that the amount of infrastructure to be provided at the PSAP can be limited.

Tendler Cellular of Boston, Mass. describes an integrated, portable, unitary cellular phone incorporating a GPS receiver, a GPS antenna, a chipset for decoding the latitude and longitude derivable from the GPS receiver, and a synthesized voice indicating location. In other words, the Tendler system (cell phone) can call out to a PSAP, and then literally "tell" the operator, in synthesized voice (in English), the latitude and longitude location information. The system can also squawk the cell phone telephone number. The vendor claims that utilization of synthesized voice to announce the latitude and longitude of the E-911 caller results in a virtually infrastructureless system in which, through the provision of electronic maps on CDROM at a cost of no more than $300 per terminal, operators at the PSAPS can obtain a bulls-eye on the electronic chart by merely listening to the latitude and longitude, typing it in and receiving the bulls-eye. The Tendler system that uses synthesized voice to transmit location data is described in U.S. Pat. No. 5,555,286 assigned to Tendler Technologies, Inc.

Users and government agencies, however, have experienced difficulties with a synthesized voice system. The PSAP operator may not be skilled at recording and understanding "spoken" latitude and longitude data. The operator can make a mistake in transcribing the synthesized voice. Perhaps most important, synthesized voice data has very limited utility; it cannot be easily interfaced to other electronic systems to take automated actions based on that data.

Another public safety telephone system that includes cell phones is described in Grimes U.S. Pat. No. 5,388,147 assigned to AT&T. That 911 system provides for handling and routing both wired and wireless (cell) originated calls. Where the cell phone is connected to a GPS receiver, the GPS geo-coordinates are transmitted to the cellular switching system. Digital transmission is preferred, but an internal voice synthesizer can be actuated where digital data communication is not supported. This will often be the case, as digital data transmission systems, e.g. ISDN are available only in limited locations, and special decoders are needed as digital communication protocols are very dependent on hardware, firmware and software implementations and therefore are not universally available to support a universal public safety system.

In general, proposed location reporting telecommunication systems are too expensive to implement on a broad scale. Most of them require expensive equipment and or modifications to be made at every cell site, as well as downstream in the communications network. Systems that use the voice channel to transmit location data with voice synthesis, occupy the voice channel and thereby preclude actual voice communication (live person-to-person) over the same channel. In emergencies, a live voice connection can be critically important.

U.S. Pat. No. 5,043,736 describes a system for ascertaining the latitude and longitude of an individual or object at a remote location, and either using the location data locally (map display embedded in device) or transmitting the location data from the remote device (cellular network based) through a cellular telephone switching system (CTSS) to a base station for display. A pseudo-random code algorithm is used for correlating a position fix from the Global Positioning System (GPS) receiver, and the position fix is stored RAM, for transmission via a "special cellular modem" to a base station. Accordingly, specialized equipment is needed both in the remote device and a special "base station".

The need remains for improvements in location transmission methods and apparatus, for public safety and for other applications. Improvements are needed to improve location accuracy; to lower costs; to provide for continuously updated location information; to provide for correction of geo-position information; to implement improved, automatic routing capabilities, etc. These and other improvements are provided by the present invention in its various aspects.

SUMMARY OF THE INVENTION

A central aspect of the present invention is an "In Band" or transparent data transmission method, using audio frequency tones, so as to pass data, especially location data, transparently through the cell and wired communications network. In one embodiment, audio frequency tone encoded location data is transmitted "end-to-end" through the communications network, i.e. from a remote caller to a call taker.

Transparent transmission allows continuous voice (live human voice) communication at the same time as the data transmission over the same channel. Various audio frequency encoding schemes can be used to transmit location data over the voice channel. However, a dual tone or DTMF encoding is preferred as DTMF encode/decoding is already available in a common cell phone. Hence the present invention can be deployed for little cost, in either new or retrofitted cell phones. The invention can be implemented relatively simply by those skilled in the art, as audio tones encoding location data can be applied directly to a cell phone microphone circuit for transmission.

According to the invention, the audio tones are encoded into analog or digital form suitable for transmission over the existing telecom infrastructure. The encoded location data can be easily received and decoded at any call taker location, with little change to existing equipment. For example, existing CTSS employ circuits for encoding and decoding DTMF audio tones for use in dialing and signaling. Indeed, industry standards demand that DTMF tones pass over the network unimpeded.

According to another aspect of the invention, transparent transmission methods can be applied bidirectionally, for example to and from the PSAP or other call taker facility (which could be mobile), to allow updating location data periodically upon request.

Another aspect of the invention is a method of routing a call based on the in-band location data. The location data, for example in DTMF burst form, is conveniently extracted from a voice channel and decoded for purposes that vary in response to location of the caller, such as call routing. Another application is location-based call billing Another still further aspect of the invention is a method for correcting location data to improve location accuracy. According to the invention, a call taker site has a fixed SPS antenna, the exact location of which is accurately established by survey or the like. (The "call taker site" is used here generically; it can be a cell site, CTSS site, PSTN local office, etc., as well as a PSAP.) An SPS receiver periodically acquires location data via the fixed SPS antenna, together with time stamps, and records this data in a dynamic array or buffer. When wireless location data is received, the fixed antenna location data is consulted, based on time stamps as further explained later, and a correction factor determined and applied to the wireless data. Matching time stamps provide location accuracy within 10 meters, easily meeting the latest FCC mandate.

BRIEF DESCRIPTION OF THE DRAWINGS

FIG. 9 is an illustration of dual-tone location data signaling.

DETAILED DESCRIPTION OF PRESENTLY PREFERRED EMBODIMENTS

Hardware Overview

Figure 1:
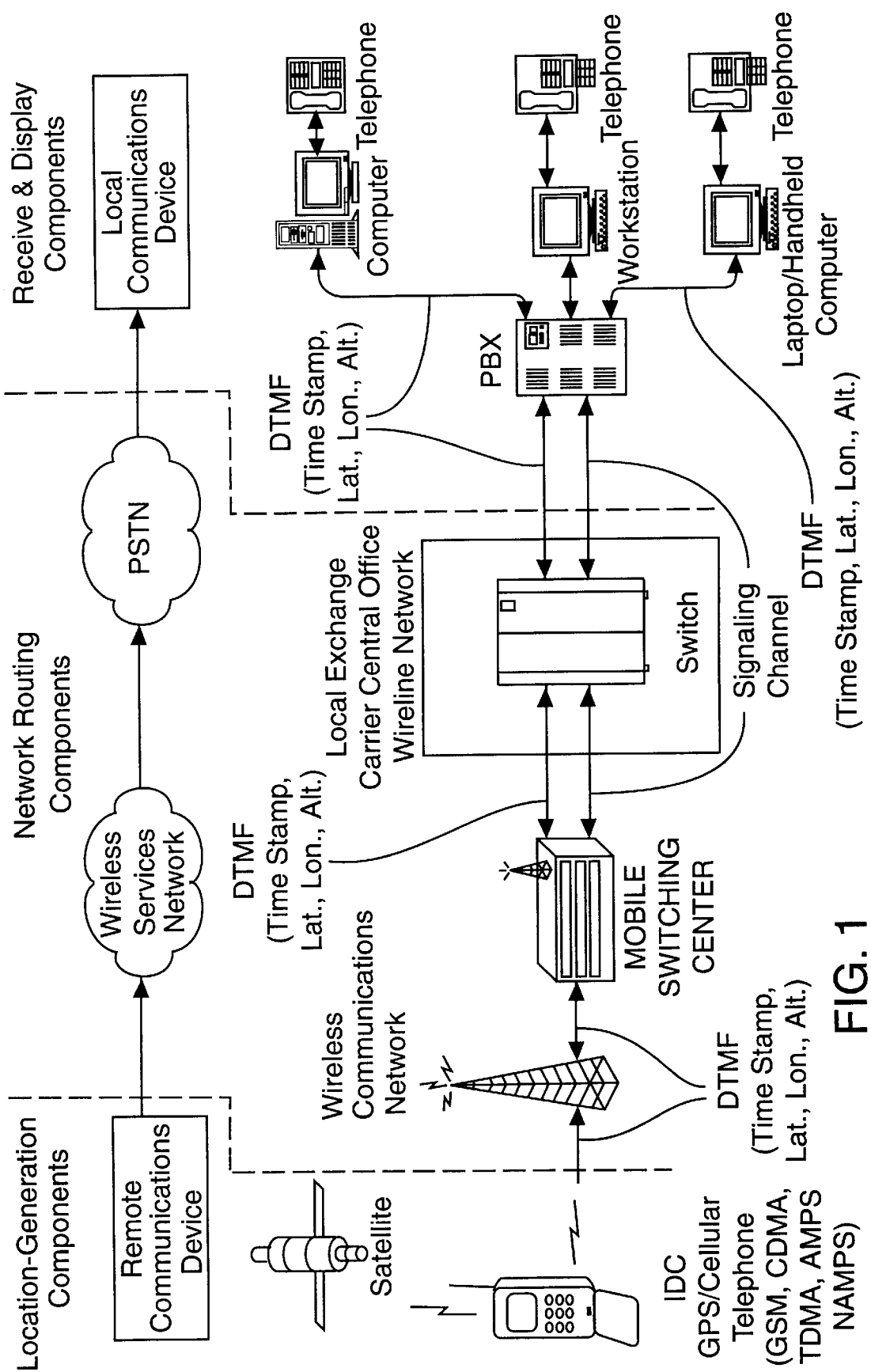
FIG. 1 is a simplified diagram of one embodiment of the present invention in a telecommunications network.
Figure 2:
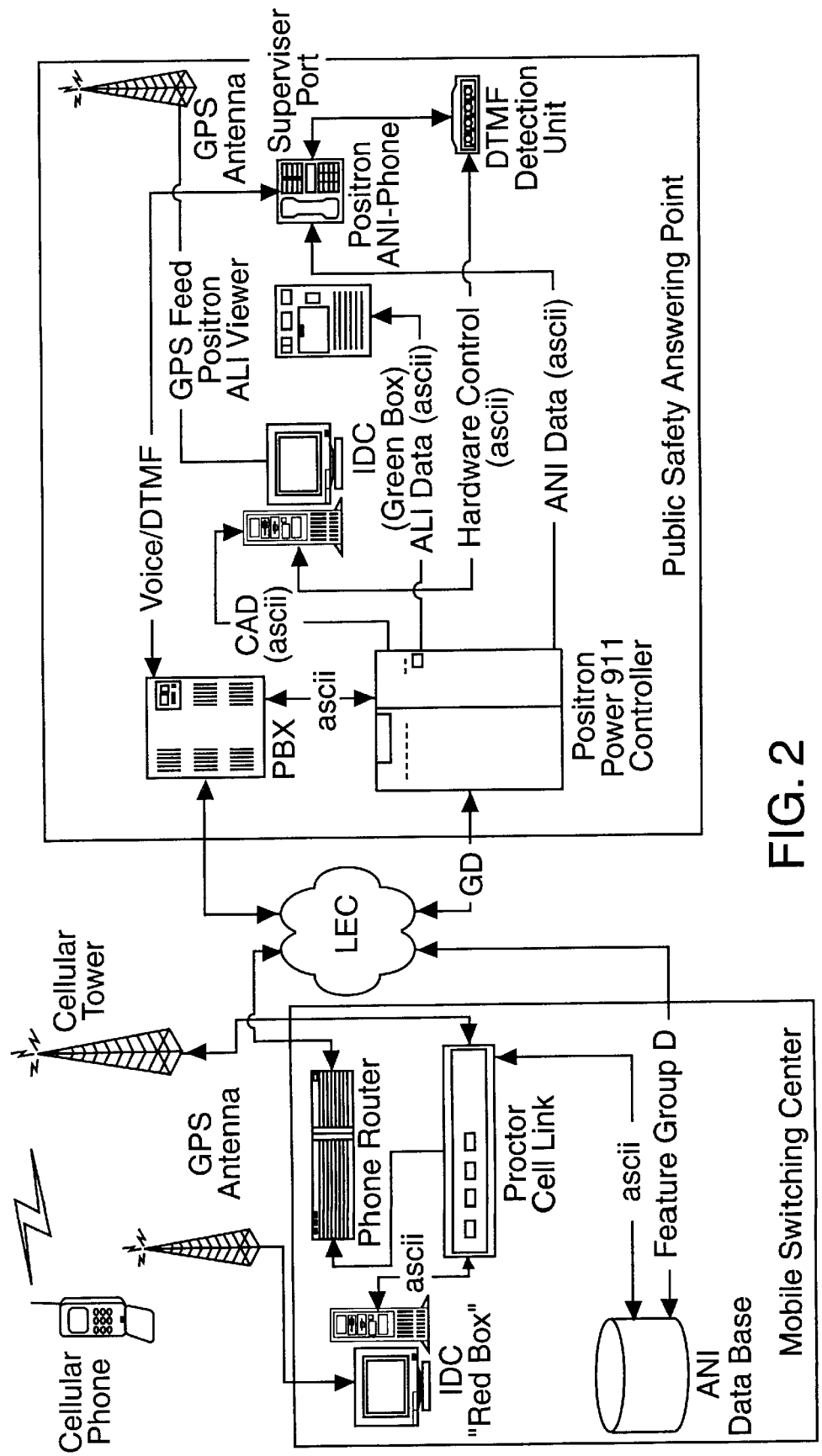
FIG. 2 is a block diagram of an implementation of the invention to support a public safety answering point (PSAP).
Figure 3:
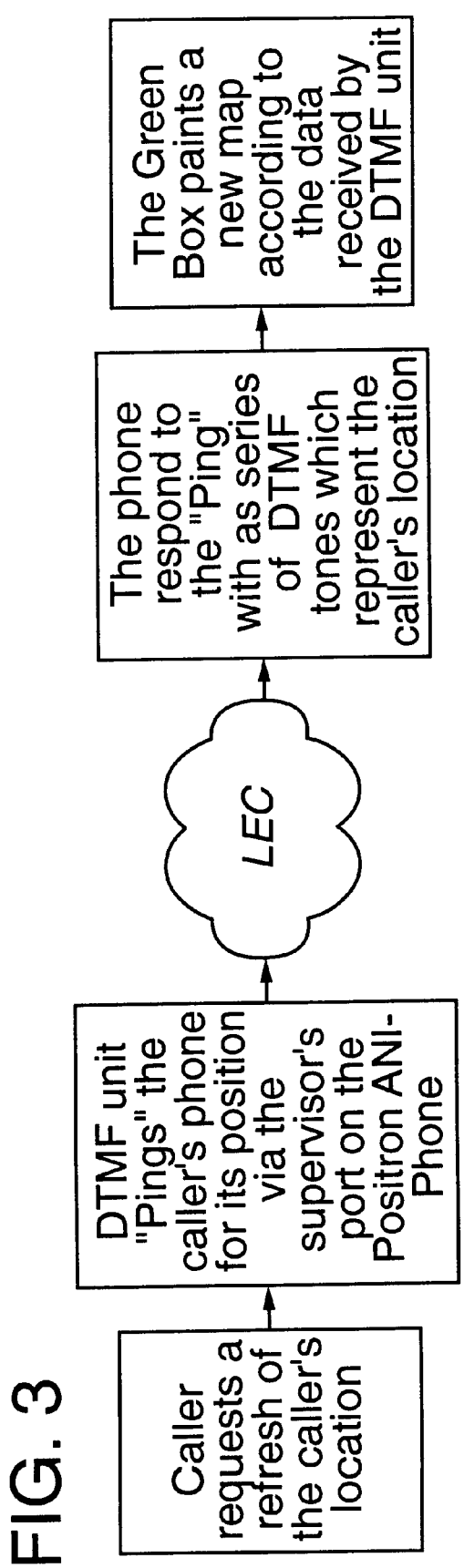
FIG. 3 illustrates a process for call taker refreshing remote caller location data.
Figure 4:
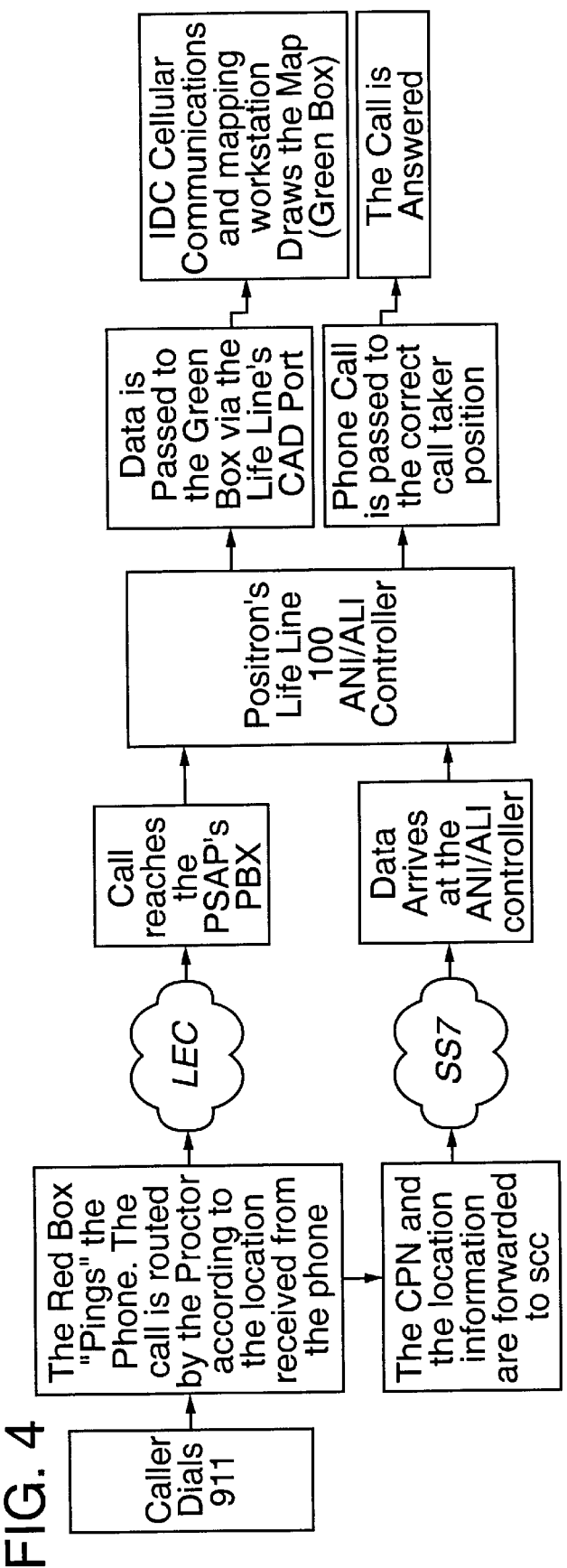
FIG. 4 illustrates a location-based call routing methodology according to the invention.
Figure 5:
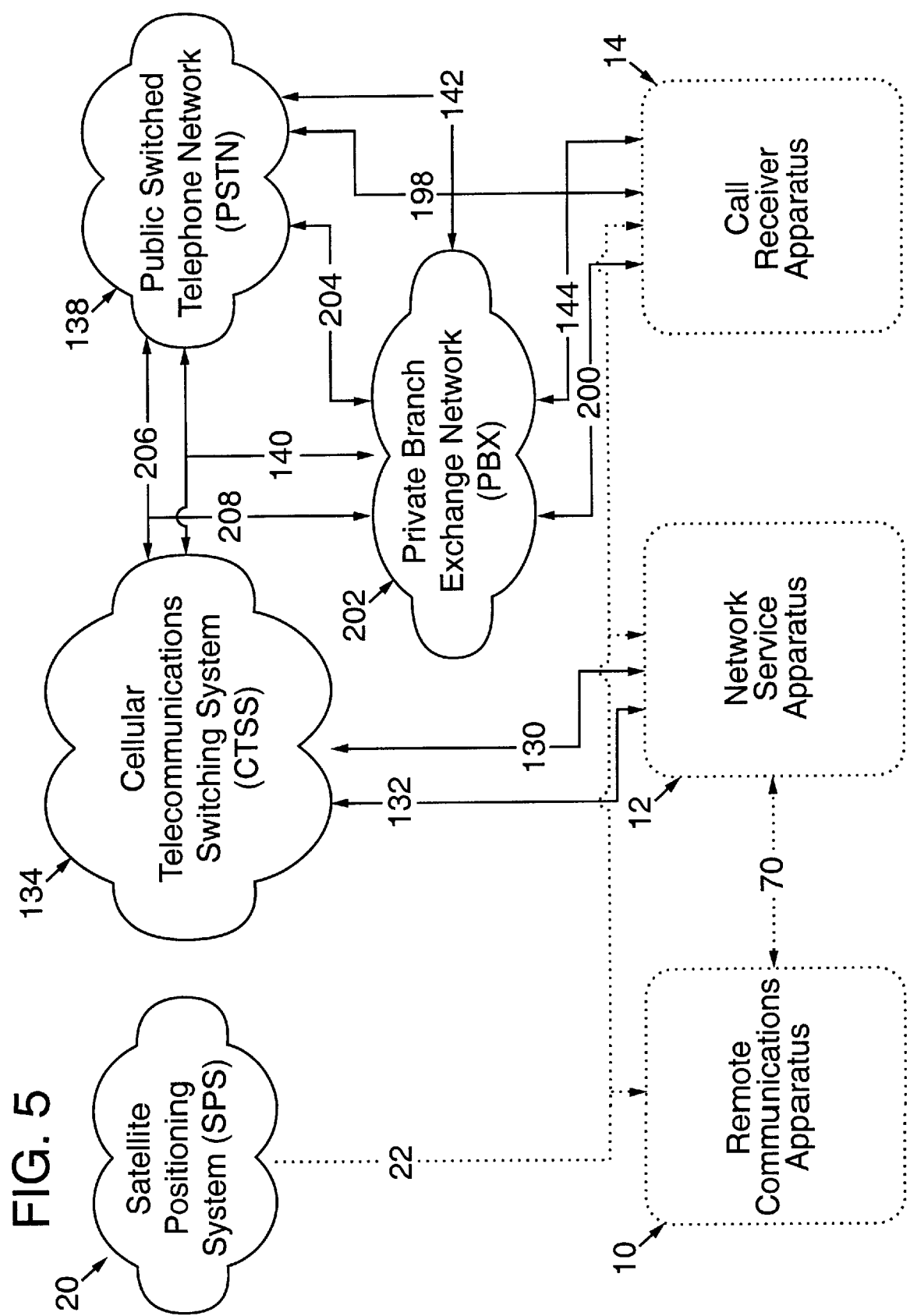
FIG. 5 is a simplified, overview block diagram of one embodiment of the invention in a system implementation. This system includes a satellite positioning system (SPS), a Remote Communication Apparatus (RCA) (e.g. a cell phone or other wireless mobile unit) having SPS location capability, a Telecommunication Service Apparatus (TSA) in communication with the Cellular Telecommunications Switching System (CTSS), and a call receiver or "call taker" apparatus (CRA) in communication with the CTSS, optionally via the Public Switched Telephone Network (PSTN).

Referring to FIG. 5, a Remote Communication Apparatus (RCA) 10 is configured to communicate to one or more NSA 12, and said CRA 14, a time stamped, 3 axis geo-position of the remote device within a telecommunication network. In this description, the RCA is also variously referred to as a remote unit, mobile unit or cell phone, the cell phone being but one example. As another example, the RCA can be a communication unit built into a motor vehicle to provide location data in the event the vehicle is lost or stolen; it need not necessarily be a conventional cell phone.

Figure 6:
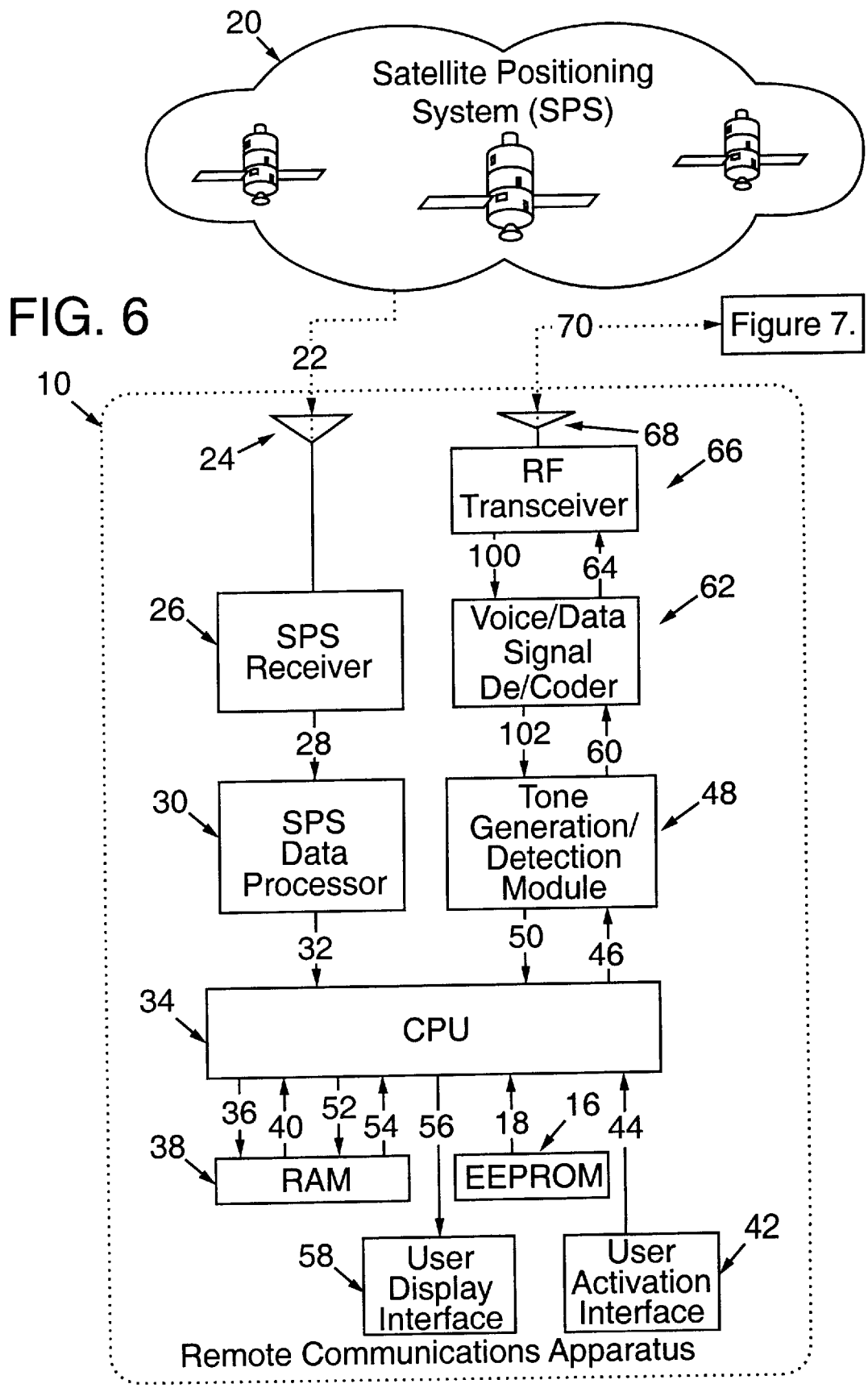
FIG. 6 is a block diagram showing greater detail of the Remote Communications Apparatus, which includes components and methods to generate time-stamped, 3 axis geo-position data representative of the apparatus' position relative to 3-axes in a system implementation of the invention.

Referring now to FIG. 6, according to one illustrative implementation, the RCA 10 is comprised of, but not limited to; a Satellite Positioning System (SPS) Receiver Antenna 24, an SPS Receiver Chip 26, an SPS Data Processor 30, a Central Processor Unit 34, a Random Access Memory Module (RAM) 38, an Electronically Erasable & Programmable Read Only Memory Module (EEPROM) 16, a Radio Frequency (RF) Transceiver Antenna 68, an RF Transceiver 66, a Voice & Data Signal Coder/Decoder Processor 62, a Tone Generation & Detection Module 48, a User Interface Display 58, and a User Activation Interface 42. It is noteworthy that many of these components already exist in a conventional cell phone design, so redesign or retrofit to implement the invention requires minimum effort and expense. For example, while the SPS receiver components must be added, the existing CPU and memory components can be shared.

Figure 7:
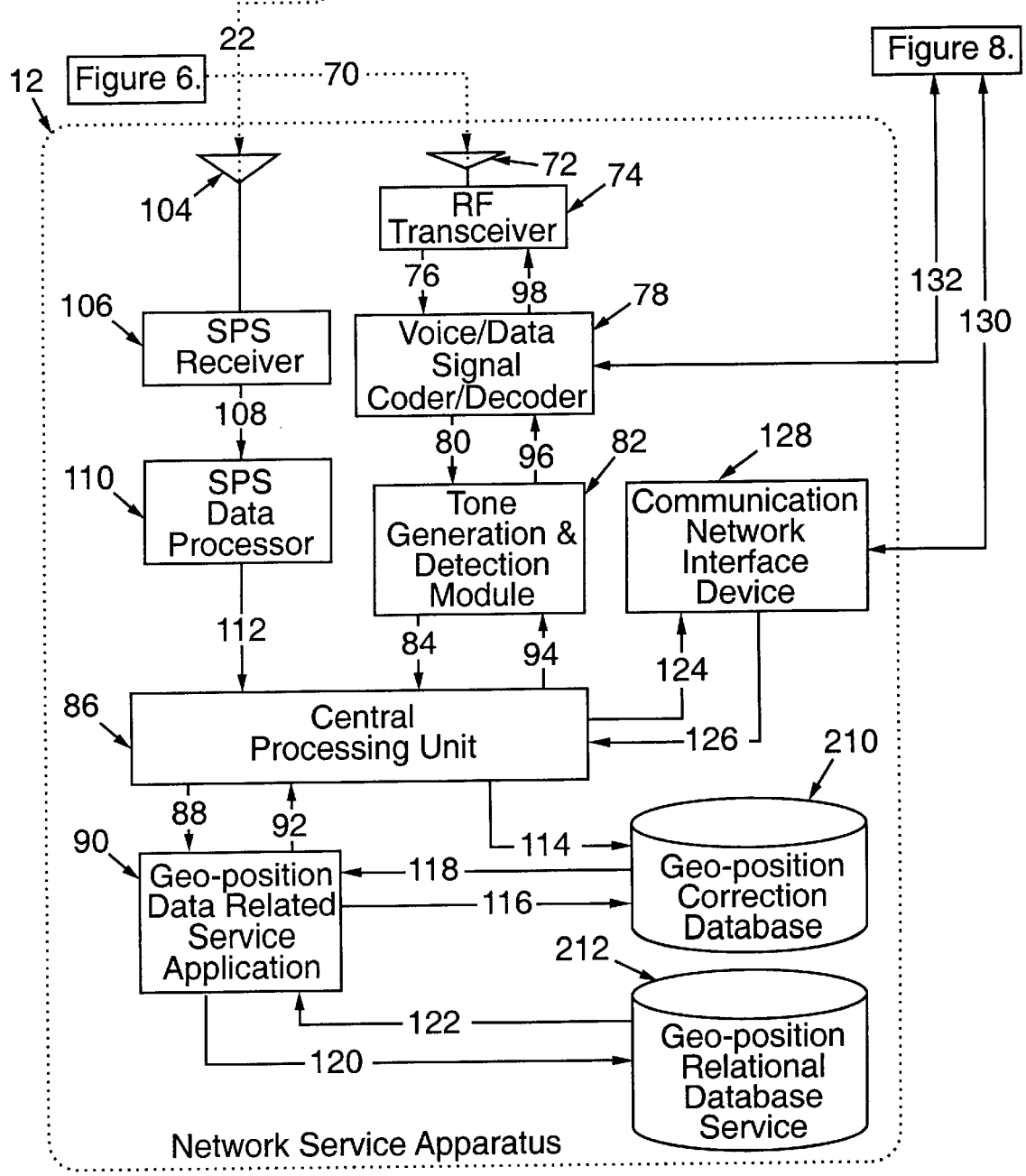
FIG. 7 is a block diagram showing greater detail of the Network Service Apparatus, which includes components and methods to process CTSS and PSTN call setup signaling, query the Remote Communication Apparatus, receive, decode, format, and perform a network related service (e.g. Call path determination) based on 3-axis geo-position data communicated by the Remote Communication Apparatus.

Referring to FIG. 7, an embodiment of a Network Service Apparatus (NSA) 12 is arranged so that the apparatus NSA 12 is able to communicate with a plurality of said RCA 10, and CRA 14, so that the apparatus 12 can provide a 3 axis geo-position relational telecommunication network data services. Examples of such services include call route determination, 3 axis geo-position related call metering, etc. based on 3 axis geo-position data received from a plurality of said RCA 10. In one illustrative implementation the NSA 12 is comprised of, but not limited to; a Satellite Positioning System (SPS) Receiver Antenna 104, an SPS Receiver Chip 106, an SPS Data Processor 110, a Central Processor Unit 86, a Radio Frequency (RF) Transceiver Antenna 72, an RF Transceiver 74, a Voice & Data Signal Coder/Decoder Processor 78, a Tone Generation & Detection Module 82, a Communication Network Interface Device 128, a 3 axis Geo-position Data Related Service Application 90, a 3 axis Geo-position Correction Database 210, and a 3 axis Geo-position Relational Database Service 212.

Figure 8:
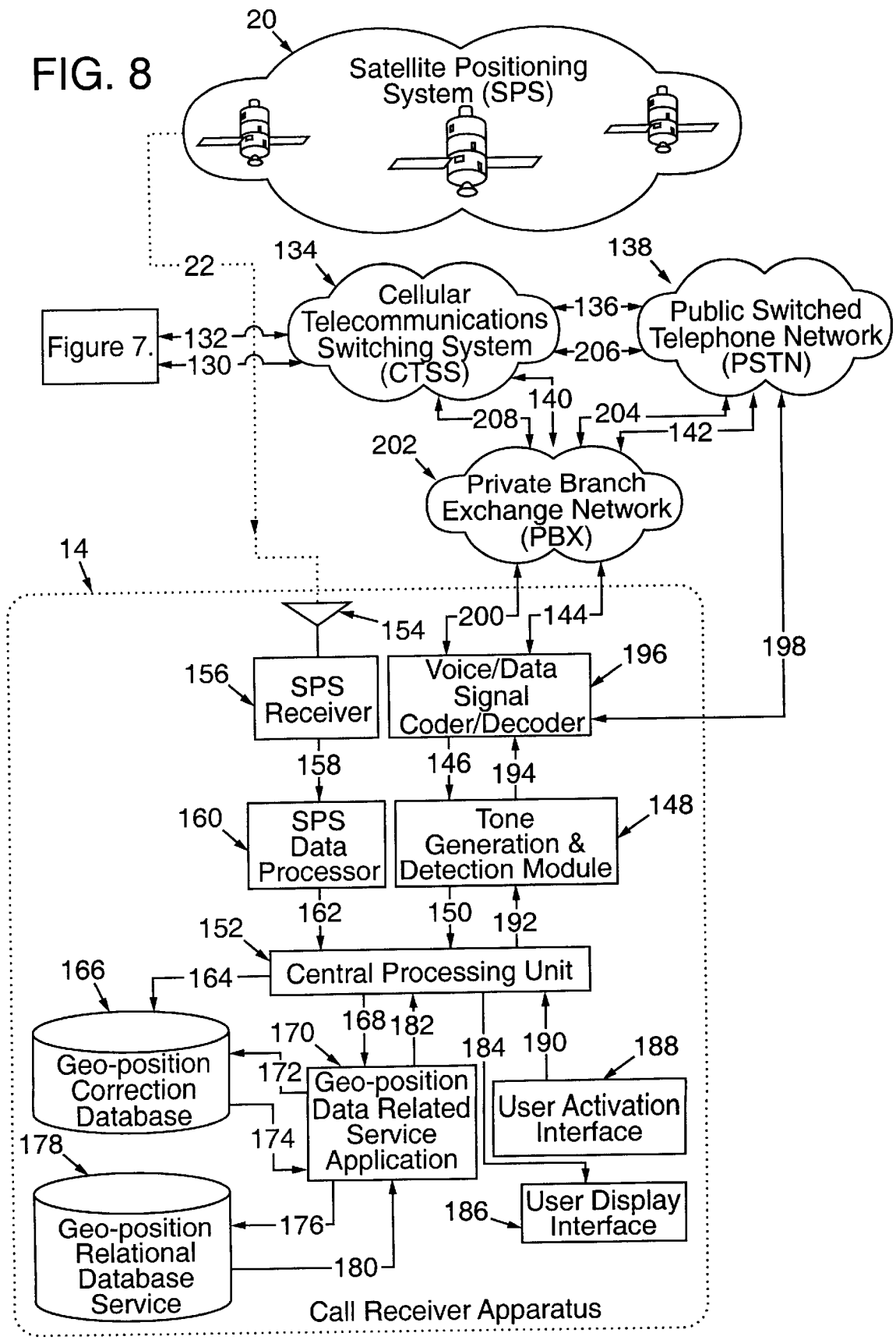
FIG. 8 is a block diagram showing greater detail of the Call Receiver Apparatus to process CTSS, PSTN, and PBX call setup signaling, query the Remote Communication Apparatus, receive, decode, format, and perform a 3-axis geo-position related service (e.g. Personnel & fleet management, and E911 location identification) based on the 3-axis geo-position data communicated by the Remote Communication Apparatus.

Referring now to FIG. 8, the Call Receiver Apparatus (CRA) 14 is configured to communicate with a plurality of said RCA 10, and NSA 12, so that said apparatus 14 can provide a 3 axis geo-position relational data service to users of said RCA 10, and said CRA 14 based on 3 axis geo-position data received from one or more RCA 10, and 3 axis geo-position relational data received from the NSA 12. According to one illustrative implementation, the CRA 14 includes, but not limited to; a Satellite Positioning System (SPS) Receiver Antenna 154, an SPS Receiver Chip 156, an SPS Data Processor 160, a Central Processor Unit 152, a Voice & Data Signal Coder/Decoder Processor 196, a Tone Generation & Detection Module 148, a 3 axis Geo-position Data Related Service Application 170, a 3 axis Geo-position Correction Database 166, and a 3 axis Geo-position Relational Database Service 178, a User Activation Interface 188, and a User Display Interface 186. The RCA need not necessarily be mobile. It can implemented in an ordinary home telephone, or a computer with an SPS receiver, etc. When a call is made from the device, its exact location is sent to the CRA. This can be useful, for example, to give exact location in a large building or industrial complex in case of emergency. Conventional ANI location lookup may be unavailable, inaccurate or simply not adequately precise.

Acquiring Location Data In The Remote Communications Apparatus

Referring again to FIG. 6, the Electronically Erasable & Programmable Read Only Memory (EEPROM)16, is a device located within, but not limited to, said RCA 10, and is pre-programmed with instructions sets, or micro-code to initialize said SPS Data Processor 26, said CPU 34, and said Tone Generation & Detection Module 48 at the onset of power to said RCA 10. The micro-code establishes operating parameters with which said devices will control and process data according to the methods of this invention.

When said RCA 10 enters a "power on" condition, the micro-code initializes said SPS Data Processor 26 to a preset data format type, for output to said Formatted SPS Data Path 32. The micro-code also initializes said SPS Data Processor 26 to a preset data output flow rate value to said Formatted SPS Data Path 32. Finally, the micro-code initializes said SPS Data Processor 26 to a preset data output occurrence rate value, or refresh rate value to said Formatted SPS Data Path 32.

The micro-code then initializes said Tone Generation & Detection Module 48 to the preset tone detection modes, or data format input to be received from said Communication Control & 3 axis Geo-position Data Transmit Path 46, and from said Decoded- Voice, Communication Control & 3 axis Geo-position Data Input Path 102. Said Tone Generation & Detection Module 48 is also initialized to a preset detection mode, or data output format to be transmitted to said Communication Control & 3 axis Geo-position Data Transmit Path 60, and to said Communication Control & 3 axis Geo-position Data Input Path 50. The said Tone Detection & Generation Module 48 is initialized to a preset data input flow rate value for detecting data from said Communication Control & 3 axis Geo-position Data Transmit Path 46, and from said Decoded-Voice, Communication Control & 3 axis Geo-position Data Input Path 102. The Tone Detection & Generation Module 48 is then initialized to a preset data output flow rate value for data output to said Communication Control & 3 axis Geo-position Data Transmit Path 60, and to the Communication Control & 3 axis Geo-position Data Input Path 50. The Tone Generation & Detection Module 48 is then initialized for a preset data occurrence rate value, or refresh rate value to said Communication Control & 3 axis Geo-position Data Transmit Path 60, and to said Communication Control & 3 axis Geo-position Data Input Path 50.

The CPU 34 is initialized to a preset "event trigger" value. The "event trigger" is a pre-programmed sequence of data or conditional inputs, via micro-code, to said CPU 34, which results in the execution of subsequent, sequential processes, and events, also pre-programmed via the micro-code into said EEPROM 16. The event trigger may be activate by any number of inputs to said CPU 34, to include, but not be limited to; input from user of said RCA 10 via said User Activation Interface 42, input received from said NSA 12 as preset Communication Control Commands (e.g. network audible signaling), input received from the CRA 14 as preset Communication Control Commands, or audible commands from a user of the CRA 14. Finally, the CPU is initialized as to preset data processing methods, and communication parameters (i.e. baud rate, data size, etc.).

The presentation of said Micro-code Output Path 18 establishes a connection of said EEPROM 16 to said CPU 34, said SPS Data Processor 30, and said Tone Detection & Generation Module 48 for initialization to preset operating parameters at the onset of a "power on" condition of said RCA 10. In the present embodiment of the invention, the said SPS Data Processor 30 is connected to said CPU 34, via a communications bus, and therefore receives initialization presets from said EEPROM 16, via commands from said CPU 34. As the SPS Data Processor, the said Tone Detection & Generation Module 48 is connected via a communications bus to said CPU 34, and also receives initialization presets from said EEPROM via said CPU 34.

The Satellite Positioning System (SPS) Network 20 is comprised of a plurality of geo-orbiting satellites, which broadcast a standardized format data packet over a given radio frequency. The data packet is readily received, converted, and made into useful data, given the implementation of the following devices in the present embodiment of the invention; the SPS Receiver Antenna 24, connected to an SPS Receiver Chip 26, connected to an SPS Data Processor 30, and an SPS Receiver Antenna 104, connected to an SPS Receiver Chip 106, connected to an SPS Data Processor 110, and an SPS Receiver Antenna 154, connected to an SPS Receiver Chip 156, connected to an SPS Data Processor 160. The connected devices are either embedded or connected to a respective apparatus as illustrated and are pre-programmed with micro-code to process the SPS Data Transmission 22 signals.

SPS Data Transmission 22 is a continuous, or streaming broadcast of data messages which are time-synchronized to an atomic clock. Because SPS Data Transmission 22 is present 24 hours a day, 7 days a week, 365 days a year, is synchronized to extremely low tolerances, and exists globally, the SPS Data Transmission 22 is well recognized as the most accurate, and available means of obtaining static and dynamic 3 axis geo-position data.

The SPS Receiver Antenna 24 implemented within the preferred embodiment of the RCA 10, is capable of receiving a specific range of said SPS Data Transmissions, and can operate within a wide range of operating environments. SPS Receiver Antenna 24 is appropriately sized for the current utilization with said RCA 10, however size and radio frequency shielding should be considered when embedding said SPS Receiver Antenna within, or close proximity to said Radio Frequency (RF) Transceiver 66 embedded within same said RCA 10. A presently preferred implementation of said SPS Receiver Antenna 24 is connected to said SPS Receiver Chip 26 via an appropriate physical means as specified by the Antenna 24 manufacturer and the SPS Receiver Chip 26 manufacturer.

SPS signals are received by said SPS Receiver Chip 26 from the SPS Receiver Antenna 24, and is converted into "raw", or non-formatted, binary SPS data streams, which are then passed on to said SPS Data Processor 30, via the Raw SPS Data Output Path 28. SPS Data Processor 30 receives the unformatted, or "Raw" binary SPS data streams via connection to said SPS Receiver Chip 26. In a presently preferred implementation the SPS Data Processor 30 is embedded into, or connected to the RCA 10. The SPS Data Processor 30 executes a pre-programmed instruction set, or micro-code specific to the manufacturer of said SPS Data Processor 30. The micro-code instructs said SPS Data Processor 30 to sample the incoming raw data stream, and acquire (lock onto) received SPS satellite signals within a preset decibel (dB) range, and then perform a validation of SPS data messages from said SPS Satellites 20. The said SPS Data Processor 30 then correlates a 3 axis geo-position, relative to the center of the geoID (earth), based on the time-synchronized data messages received from the said SPS Network 20 satellites that are within view of said SPS Receiver Antenna 24, and append the 3 axis geo-position data with data relative to the static, or dynamic position of said RCA 10, the time of said correlation, and validity of the correlated 3 axis geo-position coordinates. Per the initialization process at the onset of a "power on" condition, said SPS Data Processor 30 formats the correlated 3 axis geo-position data, and communicates the data at the preset data output flow rate, and refresh rate to said Central Processor Unit (CPU) 34, via the Formatted Geo-position Data Output Path 32.

The non-validated, formatted 3 axis geo-position data is received by the CPU 34 via said Formatted 3 axis geo-position data output path 32, and is temporarily stored in a Random Access Memory Module 38, via the Non-validated 3 axis Geo-position Data Storage Path for validation processing. The method for validating formatted 3 axis geo-position data as embodied in the present invention, retrieves the non-validated 3 axis geo-position data from the said RAM 38, via the Non-validated 3 axis Geo-position Data Path 40, and examines the data for the presence of a character, or signal which defines "Valid" or "Not Valid" 3 axis geo-position data, per the manufacturer of said SPS Data Processor. If the 3 axis geo-position data is reported as "Not Valid", then said CPU 34 ignores the 3 axis geo-position data in temporary storage within said RAM 38, and continues to sample the 3 axis geo-position data input from said SPS Data Processor. If the 3 axis geo-position data reported as "Valid", then said CPU 34 temporarily stores, or updates said RAM 38 with "Valid", formatted 3 axis geo-position data via the Valid 3 axis Geo-position Data Storage Path 52. In the preferred embodiment of the invention, this process begins at the onset of a "power on" condition of the RCA 10, and continues irrespective of other processes performed by the RCA 10, until a "power off" condition is achieved, or other pre-programmed micro-code instructs said CPU 34 otherwise.

In the present embodiment of the invention, when said RCA 10 is in a "power on" condition, a number of means may be utilized to initiate an active 3 axis geo-position related communication session. The user of said RCA 10, can initiate a sequence of commands via the User Activation Interface 42, which represent a pre-programmed event trigger, in which the RCA 10 will proceed to communicate a 3 axis geo-position to either said NSA 12, or said CRA 14. The User Activation Interface 42 can take the form of a single momentary switch used only in special circumstances, or as a regular RCA 10. The User Activation Interface 42 may also be in the form of a key pad, allowing the user to initiate the event trigger via a pre-programmed sequence of key presses, communicated to the CPU 34 via the User Activation Interface Path 44.

The User Activation Interface 42 may also be in the form of a measurement device embedded in, or attach to the RCA 10 via the User Activation Interface Path 44, which measures environmental, dynamic, and static inputs of the RCA 10, the user, as well as those detectable conditions of the environment in the immediate vicinity of the RCA 10. This allows the measurement device, which now acts as an automated User Activation Interface 42, initiate an event trigger when a pre-programmed condition has been satisfied (accelerometer input, timer input, temperature input, etc.). The User Activation Interface 42 may also be in the form of an on-board audio detection device connected to said CPU 34 via the User Activation Interface Path 44, which utilizes a speech recognition algorithm, allowing the user to initiate the event trigger via a selected natural spoken, phonetic language (English, Japanese, Chinese, French, German, etc.).

In a presently preferred implementation of said User Activation Interface, all inputs by the user of the RCA 10, and communication control commands, and 3 axis geo-position relational data received by the RCA 10, is sent to the User Display Interface 58 via the Communication Control & 3 axis Geo-position Related Data Display Output Path 56. This provides the user with feedback that the proper sequence of user activation inputs were processed to initiate an 3 axis geo-position communication event trigger. 3 axis geo-position related data received from said NSA 12, and said CRA 14 can also be displayed in the present embodiment of the invention.

Another method for initiating a 3 axis geo-position communication session, is for the Call Receiver Apparatus (CRA) 14 to initiate a communication session with said RCA 10. When a communication channel has been established between said devices, the CRA 14 may use a signaling method, or query command, which is pre-programmed into both devices, causing the RCA 10 to respond by transmitting a 3 axis geo-position to said CRA 14.

Interaction With The Network Service Apparatus

The RCA 10 initiates a communication path to the NSA 12. When a communication path is established between the RCA 10 and the NSA 12, the CPU 34 is instructed by the pre-programmed micro-code to automatically send "Valid" 3 axis geo-position data to the NSA 12. The NSA 12 can be automatically instructed by the 3 axis Geo-position Data Related Service Application 90, to automatically send a recognized communication control command back to the RCA 10, when a communication session has been initiated by said RCA 10.

Referring again to FIG. 7, the 3 axis Geo-position Data Related Service Application 90 sends the pre-programmed communication control data to the CPU 86 via the Communication Control & 3 axis Geo-position Related Data Output Path 92. The CPU 86 sends the communication control data on the Tone Detection & Generation Module 82 via the Communication Control & 3 axis Geo-position Data Related Transmit Path 94. The communication control data is then converted into an audio tone representation of the data by the tone generation function of the Tone Detection & Generation Module 82. The audio tone signaling preferably is DTMF or another multiple (2 or more) tone frequency protocol. Since DTMF is an international telecommunications standard protocol, the invention can be used with virtually all telephony signaling devices, analog or digital, including e.g. ISDN, DS-0,1, CAMA, FGD, DMA, TDMA, GSM, AMPS, etc. The tone data is then forwarded to the Voice/Data Signal De/Coder Module 78 via the Communication Control 3 axis Geo-position Data Related Transmit Path 96. This device formats the audio tones into a data stream appropriate to the manufactures method of transmitting voice & data via the Radio Frequency (RF), Coded-Voice, Communication Control and 3 axis Geo-position Data Path 70 (CDMA, TDMA, NAMPS, GSM, VHF, UHF, etc.).

Location Data Encoding

In a presently preferred embodiment, location data is encoded in to at least one string, while additional strings of data can be transmitted as well, automatically or upon request. The basic string contains time stamp, latitude, longitude and altitude data. The time stamp comprises 3 characters—minute, second, second. For example, at 08:22:33 the time stamp is 2,3,3 as the hour and tens of minutes are ignored. This much is adequate because location data is updated frequently, for example every second or two. For data correction, described later, a 60-second array of data is maintained. That implies 60 samples or locations are stored, based on one update per second. The latitude requires 8 characters, and longitude 9 characters, and altitude 3 characters. So in a preferred embodiment a basic data string is 23 characters long. Additional strings can be used to transmit, for example, direction vector and speed.

Each data character is translated, for example by a lookup table, to a corresponding set of two or more audio frequency tones. Preferably, DTMF is used, although other multiple tone encoding can be used. A tone set or pair is transmitted for a 40 msec burst, followed by a 40 msec blank. Thus one character of data is transmitted every 80 msec during transmission of the basic string. The 23 characters defining the string will take a total of 23×80 msec or 1.8 seconds. Of course this protocol is merely illustrative; the number of audio tones, tone frequencies, burst size, burst rate, and refresh rate etc. can all be selected as desired for a particular application. In any event, the resulting audio burst (1.8 second transmission) is added to the audio channel, and coexists along with (or is added to) the voice content. It need not be annoying to the user. The audio level or amplitude of the data burst can be controlled by the CPU or preset. The data burst can be made relatively low level—barely audible—so that one can talk right over it. On the other hand, it is preferred especially for emergency calls to the PSAP that the tones be plainly audible, as this provides reassurance to the user that the line is active, and indeed location data is updating.

Returning now to the description of the apparatus, the coded-communication control data is sent to the Radio Frequency (RF) Transceiver 74 via the Coded-Voice, Communication Control and 3 axis Geo-position Data Path 98. The RF Transceiver 74 then converts the input data from the Voice/Data Signal De/Coder Module 78 into an RF transmission, at a frequency pre-determined by the manufacturer of said device. The data transmission is then emitted from the RF Transceiver Antenna 72, to the RCA 10 RF Transceiver Antenna 68. Referring now to FIG. 6, the signal is received via the RF, Coded-Voice, Communication Control & 3 axis Geo-position Data Path 70. The signal received by the RF Transceiver Antenna 68 sends the signal to the RF Transceiver 66. The RF Transceiver 66 then converts the received signals to a format which is pre-determined by manufacturer of said RF Transceiver 66 and is usable by the Voice/Data Signal De/Coder Module 62, which receives the communication control data via the Coded-Voice, Communication Control and 3 axis Geo-position Data Input Path 100. The Voice/Data Signal De/Coder 62 uses a decoding algorithm, pre-programmed by the manufacturer of said Voice/Data Signal De/Coder 62 to re-assemble the received data into a format usable by the Tone Detection & Generation Module 48. The decoded communication control data is then sent to the Tone Detection & Generation Module 48 via the Decoded-Voice, Communication Control and 3 axis Geo-position Data Input Path 102. The communication control data is received by the tone diction function of the Tone Detection & Generation Module 48, and is then converted from an audio tone representation of the data to a format preset by the manufacturer of said Tone Detection & Generation Module 48, which is usable by the CPU 34 of the RCA 10. The communication control data is then received by the CPU 34 via the Communication Control & 3 axis Geo-position Data Input Path 50. Per the pre-programmed micro-code, the CPU 34 recognizes the communication control input data as a command to communicate 3 axis geo-position data to the NSA 12.

When an event trigger has been enabled (user activation input, or communication control input), the CPU 34 executes a set of instructions so as to communicate 3 axis geo-position data. As the CPU 34 continues to receive, validate, and update the RAM with "Valid" data, the CPU 34 samples the RAM 38, via the Valid 3 axis Geo-position Data Path 52, for current "Valid" 3 axis geo-position data. If 3 axis geo-position data from the SPS Data Processor 30 is "Not Valid", then the CPU 34 maintains, retrieves via the Valid 3 axis Geo-position Data Retrieval Path 54, and communicates the last "Valid" 3 axis geo-position data, until new "Valid" 3 axis geo-position data is obtained, and updated into RAM 38. If "Valid" data is not realized by the CPU 34 after a preset timeout condition has been achieved, the CPU 34 will default to communicating the "Not Valid" data.

During the sampling and communication of said "Valid" 3 axis geo-position data, the CPU 34 disables the 3 axis geo-position data validation process, so that existing "Valid" data is not corrupted, erased, or over-written during the sampling and communication sequence. However, during the transmission of "Not Valid" 3 axis geo-position data, the validation process continues, and in the event "Valid" 3 axis geo-position data is realized, the CPU 34 will interrupt the transmission of "Not Valid" 3 axis geo-position data, update the RAM 38 with "Valid" 3 axis geo-position data, and proceed to transmit the new "Valid" 3 axis geo-position data.

The CPU 34 sends the data to the Tone Detection & Generation Module 48 via the Communication Control & 3 axis Geo-position Data Transmit Path 46. The "Valid" geo-position data is then converted into an audio tone representation of the data by the tone generation function of the Tone Detection & Generation Module 48. This data is then forwarded to the Voice/Data Signal De/Coder Module 62 via the Communication Control 3 axis Geo-position Data Transmit Path 60. This device formats the audio tones into a data stream appropriate to the manufactures method of transmitting voice & data via the Radio Frequency (RF), Coded-Voice, Communication Control and 3 axis Geo-position Data Path 70 (CDMA, TDMA, NAMPS, GSM, VHF, UHF, etc.).

The Coded-Voice, Communication Control and 3 axis Geo-position Data is then sent to the Radio Frequency (RF) Transceiver 74 via the Coded-Voice, Communication Control and 3 axis Geo-position Data Path 64. The RF Transceiver 74 then converts the input data from the Voice/Data Signal De/Coder Module 62 into an RF transmission, at a frequency pre-determined by the manufacturer of said device. The data transmission is then emitted from the RF Transceiver Antenna 68, to the NSA 12 RF Transceiver Antenna 72 via the RF, Coded-Voice, Communication Control & 3 axis Geo-position Data Path 70. The signal received by the RF Transceiver Antenna 72 sends the signal to the RF Transceiver 74. The RF Transceiver 74 then converts the received signals to a format which is pre-determined by manufacturer of said RF Transceiver and is usable by the Voice/Data Signal De/Coder Module 78, which receives the data via the Coded-Voice, Communication Control and 3 axis Geo-position Data Path 76. The Voice/Data Signal De/Coder 78 uses a decoding algorithm, pre-programmed by the manufacturer of said Voice/Data Signal De/Coder 78 to re-assemble the received data into a format usable by the Tone Detection & Generation Module 82. The decoded 3 axis geo-position data is then sent to the Tone Detection & Generation Module 82 via the Decoded-Voice, Communication Control and 3 axis Geo-position Data Path 80. The 3 axis geo-position data received by the tone diction function of the Tone Detection & Generation Module 82, and is then converted from an audio tone representation of the data to a format preset by the manufacturer of said Tone Detection & Generation Module 82, which is usable by the CPU 86 of the NSA 12. The 3 axis geo-position data is then received by the CPU via the Communication Control & 3 axis Geo-position Data Path 84. The CPU 86 sends the "Valid" 3 axis geo-position data to the 3 axis Geo-position Data Related Service Application 90 for processing, via the Communication Control & 3 axis Geo-position Data Input Path 88.

The preferred embodiment of the NSA 12 uses a similar implementation as the RCA 10, of embedded, or connected SPS devices to the NSA 12. The use of 3 axis geo-position data from said devices, however, is for the purposes of correcting the "built-in" error of said SPS Transmission Data 22, as further explained later.

The preferred implementation of said SPS Receiver Antenna 104 is as currently exists in the present embodiment of the invention. The said SPS Receiver Antenna 104 implemented within the preferred embodiment of said NSA 12, is capable of receiving a specific range of said SPS Data Transmissions, and can operate within a wide range of operating environments. The said SPS Receiver Antenna 104 is appropriately sized for the current utilization with said NSA 12, however size and radio frequency shielding is to be considered when embedding said SPS Receiver Antenna within, or close proximity to said Radio Frequency (RF) Transceiver 74 embedded within same said NSA 12. The preferred implementation of said SPS Receiver Antenna 104 is connected to said SPS Receiver Chip 106 via an appropriate physical means as set forth by said SPS Receiver Antenna 104 manufacturer and said SPS Receiver Chip 106 manufacturer.

SPS signals are received by said SPS Receiver Chip 106 from said SPS Receiver Antenna 104, and is converted into "raw", or non-formatted, binary SPS data streams, which are then passed on to said SPS Data Processor 110, via said Raw SPS Data Output Path 108. The SPS Data Processor 110 receives unformatted, or "Raw" binary SPS data streams via connection to said SPS Receiver Chip 106. The present, and preferred implementation of said SPS Data Processor 110, is embedded into, or connected to said NSA 12. The said SPS Data Processor 110 executes a pre-programmed instruction set, or micro-code specific to the manufacturer of said SPS Data Processor 110. The micro-code instructs the SPS Data Processor 110 to sample the incoming raw data stream, and acquire (lock onto) received SPS satellite signals within a preset decibel (dB) range, and then perform a validation of SPS data messages from said SPS Satellites 20. The said SPS Data Processor 110 then correlates a 3 axis geo-position, relative to the center of the geoID (earth), based on the time-synchronized data messages received from the said SPS Network 20 satellites that are within view of said SPS Receiver Antenna 104, and appends the 3 axis geo-position data with data relative to the static, or dynamic position of said NSA 12, the time of said correlation, and validity of the correlated 3 axis geo-position coordinates. Per the initialization process at the onset of a "power on" condition, said SPS Data Processor 110 formats the correlated 3 axis geo-position data, and communicates the data at the preset data output flow rate, and refresh rate to said Central Processor Unit (CPU) 86, via the Formatted 3 axis Geo-position Data Output Path 112.

The CPU 86 is instructed by the 3 axis Geo-position Data Related Service Application 90 to perform a validation on the formatted 3 axis geo-position data input. If the 3 axis geo-position data is found to be "Valid", the CPU 86 will send the 3 axis geo-position data to the 3 axis Geo-position Correction Database 210 for future input to a 3 axis geo-position error correction algorithm, via the 3 axis Geo-position Correction Database Record Input Path 114.

The 3 axis Geo-position Data Related Service Application 90 receives the 3 axis geo-position data communicated by the RCA 10, and performs a validation on the received data. If the data is corrupt, the 3 axis Geo-position Data Related Service Application 90 will transmit a communication control command back to the RCA 10, to send 3 axis geo-position data. Upon receipt of validated 3 axis geo-position data from the RCA 10, the 3 axis Geo-position Data Related Service Application 90 examines the time-stamp of the received 3 axis geo-position data from the RCA 10. The said application 90 then queries the 3 axis Geo-position Correction Database via the Database Query Path 116 to return a 3 axis geo-position correction record with the same time-stamp via the Database Record Return Path 118.

The 3 axis Geo-position Data Related Service Application implements an error correction algorithm which utilizes two dynamically updated variable data inputs, and a user defined variable data input. The user defined variable data input represents a professionally surveyed, or bench-marked 3 axis geo-position of the NSA 12. This 3 axis geo-position represents a known location from which to reference deviations of correlated SPS Transmission Data 22. The first dynamic variable data input is the 3 axis geo-position received by the local SPS Data Processor 110, and connected SPS devices, which is stored in said 3 axis Geo-position Correction Database 210. This data represents the correlated 3 axis geo-position of the NSA 12, and is used in conjunction with the user defined variable, to calculate a 3 axis geo-position deviation factor from the known, or bench-marked 3 axis geo-position. The second dynamic variable data input is the "Valid" 3 axis geo-position data received from the RCA 10. This data represents the correlated 3 axis geo-position of the RCA, and is used in conjunction with the computed 3 axis geo-position deviation factor, in order to calculate a corrected 3 axis geo-position of said RCA 10. Position correction methods and apparatus are described further below with reference to FIGS. 14 and 15.

Network Implemented Services

After performing an error correction on the RCA 10 3 axis geo-position, the 3 axis Geo-position Data Related Service Application 90 then forwards the 3 axis geo-position data to a 3 axis Geo-position Relational Database Service 212, via the Corrected 3 axis Geo-position Data Input Path 120. This service 212 utilizes the corrected 3 axis geo-position data of the RCA 10, in order to return a pre-determined data record via the 3 axis Geo-position Relational Data Output Path 122, relative to the 3 axis geo-position communicated by the RCA 10, which would enable the user of said NSA 12 to perform a network related service for user of said RCA 10, or user of said NSA 12, based on the 3 axis geo-position relational data input to said Geo-position Data Related Service Application 90. In some cases, said 3 axis Geo-position Relational Database Service 212 may never return a 3 axis geo-position relational data record to the 3 axis Geo-position Data Related Service Application 90, but instead would store the 3 axis geo-position of said RCA 10, for future processing, or communication to services outside the realm of this invention.

The 3 axis Geo-position Data Related Service Application 90 in the present embodiment of the invention can perform any one of several actions. Said application 90 can send further communication control, and 3 axis geo-position relational data back to the user of said RCA 10. The said application 90 can send 3 axis geo-position relational data to a Communication Network Interface Device 128, via the Communication Control & 3 axis Geo-position Relational Data Path 124, enabling said application 90 to send communication control data, 3 axis geo-position deviation factor data, uncorrected 3 axis geo-position data of said RCA 10, corrected 3 axis geo-position data of said RCA 10, and the associated 3 axis geo-position relational data to a plurality of telecommunication network devices via the Communication Control & 3 axis Geo-position Data Path 130. The final option is that said application 90 performs no further action, and merely performs all processes to a process point pre-defined in said application 90 code, or the user of said application.

In one illustrative implementation of the invention, the NSA 12 performs a service for said RCA 10 utilizing said application 90 to determine a destination of the communication session event. The application 90 would send the 3 axis geo-position relational data to the CPU 86 via the Communication Control & 3 axis Geo-position Related Data Output Path 92. The CPU 86 then sends the data to said Communication Network Interface Device via said Communication Control & 3 axis Geo-position Relational Data Path 124. The Communication Network Interface Device 128 sends and receives communication control data, and/or 3 axis geo-position relational data to a plurality of network devices connected to a Cellular Telecommunications Switching System (CTSS) 134 via the Communication Control & 3 axis Geo-position Relational Data Path 130. In some implementations of the invention, the 3 axis Geo-position Data Related Service Application requires feedback, or other 3 axis geo-position relational data from a plurality of telecommunications network devices comprising of either a CTSS 134, a PSTN 138, or PBX 202. This data is received by the Communication Network Interface Device 128 via the Communication Control & 3 axis Geo-position Relational Data Path 130, and is sent to the CPU 84 via the Communication Control & 3 axis Geo-position Relational Data Input Path 126.

Referring once again to FIG. 5, communication control data and/or 3 axis geo-position relational data is then forwarded by the CTSS 134 to one of several paths. Depending on the destination, or service requested by the user of said RCA 10, the CTSS 134 may then forward the communication session to another RCA 10 utilizing the same, or different said CTSS 134, in effect assuming a similar role as the CRA 14. Because the destination of the communication session is with another RCA 10 implementing the same methods of this invention, the users of both RCA's 10 have the ability to send and receive communication control and 3 axis geo-position data to the other RCA 10. In the present embodiment of the invention, the call is forwarded from the CTSS 134 to the destination RCA 10 via the Communication Control & 3 axis Geo-position Data Path 130. The communication session request is received by the RCA 10 via a cellular communication control method which exists irrespective of this invention. When the user of said destination RCA 10 accepts the communication session request, the plurality of CTSS 134 telecommunication network devices use existing functionality to complete a communications circuit represented by the Coded-Voice, Communication Control and 3 axis Geo-position Data Path 70, and the Voice, Communication Control & 3 axis Geo-position Data Path 132.

Depending on the pre-programmed micro-code, and the action of the users of both the originating and receiving RCA's 10, any number of 3 axis geo-position data event triggers may enable the communication of 3 axis geo-position data from one RCA 10 to the other. Also, depending on the processing capability of said CPU 34, the pre-programmed micro-code, and/or attached peripheral devices to either the originating or receiving RCA's 10, they may be capable of performing an error correction on 3 axis geo-position data.

Another option of the CTSS 134 is to forward the communication session, and associated communication control and 3 axis geo-position relational data to a plurality of telecommunication network devices comprising a Public Switched Telephone Network (PSTN) 138, via the Communication Control & 3 axis Geo-position Data Path 136.

Depending on the service requested by the user of said RCA 10, and/or the 3 axis geo-position relational data forwarded to the PSTN 138, the communication session destination may be forwarded by said PSTN 138 via a Voice, Communication Control & 3 axis Geo-position Data Path 198, to a PSTN subscribing (e.g. POTS) CRA 14.

Depending on the service requested by the user of said RCA 10, and/or the 3 axis geo-position relational data forwarded to the PSTN 138, the communication session destination may be forwarded by said PSTN 138, via the Communication Control & 3 axis Geo-Position Related Data Path 140 to a CRA 14 acting as a call receiving "Agent" within a Private Branch Exchange Network 202.

Depending on the service requested by the user of said RCA 10, and/or the 3 axis geo-position relational data forwarded to the CTSS 134, the communication session destination may be forwarded to a CRA 14, connected to said CTSS 134, as a call receiving "Agent" within a Private Branch Exchange Network 202.

Operation Of The Call Receiver Apparatus (Cra)

Acceptance of the communications session by the CRA 14, completes a communication circuit back to said RCA 10, now enabling direct 3 axis geo-position communication between said RCA 10 and said CRA 14, via the Communication Control & 3 axis Geo-position Data Related Transmit Path 192; the Communication Control 3 axis Geo-position Data Related Transmit Path 194; the Voice, Communication Control, and 3 axis Geo-position Data Path 198, the Voice, Communication Control, and 3 axis Geo-position Data Path 206; the Voice, Communication Control, and 3 axis Geo-position Data Path 132; the Coded-Voice, Communication Control and 3 axis Geo-position Data Transmit Path 98; the RF, Coded-Voice, Communication Control and 3 axis Geo-position Data Path 70; the Coded-Voice, Communication Control and 3 axis Geo-position Data Input Path 100; the Decoded-Voice, Communication Control and 3 axis Geo-position Data Input Path 102; the Communication Control & 3 axis Geo-position Data Input Path 50; the Communication Control & 3 axis Geo-position Data Transmit Path 46; the Communication Control & 3 axis Geo-position Data Transmit Path 60; the Coded-Voice, Communication Control and 3 axis Geo-position Data Path 64; the Coded-Voice, Communication Control and 3 axis Geo-position Data Path 76; and the Decoded-Voice, Communication Control and 3 axis Geo-position Data Path 146 as described above. If CRA 14 is implemented in a PBX communication environment, then the following additional representations of; the Coded-Voice, Communication Control and 3 axis Geo-position Data Path 200; the Voice, Communication Control, and 3 axis Geo-position Data Path 204; the Voice, Communication Control, and 3 axis Geo-position Data Path 206; and the Voice, Communication Control, and 3 axis Geo-position Data Path 208 are applicable.

Depending on the implementation of said CRA 14, in a PBX 202 environment, the communication control and or 3 axis geo-position related data is received by the PBX 202 via the Communication Control & 3 axis Geo-Position Related Data Path 140 from the CTSS 134, or the Communication Control & 3 axis Geo-Position Related Data Path 142 from the PSTN 138, and is received by said CRA 14 via the Communication Control & 3 axis Geo-Position Related Data Path 144.

The RCA 10 initiates a communication path to said CRA 14. When a communication path is established between the RCA 10 and the CRA 14, the CPU 34 is instructed by the pre-programmed micro-code to automatically send "Valid" 3 axis geo-position data to the CRA 14. The CRA 14 can be automatically instructed by the 3 axis Geo-position Data Related Service Application 170, to automatically send a recognized communication control command back to the RCA 10, during a communication session with said RCA 10.

The 3 axis Geo-position Data Related Service Application 170 sends the pre-programmed communication control data to the CPU 152 via the Communication Control & 3 axis Geo-position Related Data Output Path 182. The CPU 152 sends the communication control data on the Tone Detection & Generation Module 148 via the Communication Control & 3 axis Geo-position Data Related Transmit Path 192. The communication control data is then converted into an audio tone representation of the data by the tone generation function of the Tone Detection & Generation Module 148. This data is then forwarded to the Voice/Data Signal De/Coder Module 196 via the Communication Control 3 axis Geo-position Data Related Transmit Path 194. This device formats the audio tones into a data stream appropriate to the manufactures method of transmitting voice & data via the Coded-Voice, Communication Control and 3 axis Geo-position Data Path 200, (ISDN, Analog).

In a PBX 202 implementation of the invention, the coded-communication control data is sent to the PBX 202 via the Coded-Voice, Communication Control and 3 axis Geo-position Data Path 200. Depending on the communication circuit path, the PBX 202 decodes the data, and forwards the communication control data to the PSTN 138 via the Voice, Communication Control, and 3 axis Geo-position Data Path 204, which in turn, forwards said communication control data to said CTSS 134 via the Voice, Communication Control, and 3 axis Geo-position Data Path 206, or the PBX 202 decodes said data, and forwards the communication control data directly to the CTSS 134. Otherwise the communication data is sent to the PSTN 138 via the Voice, Communication Control and 3 axis Geo-position Data Path 198.

The CTSS 134 sends the communication control data to the NSA 12 via the Voice, Communication Control, and 3 axis Geo-position Data Path 132. Said data is received by the Voice/Data Signal De/Coder 78. This device formats the audio tones into a data stream appropriate to the manufactures method of transmitting voice & data via the Radio Frequency (RF), Coded-Voice, Communication Control and 3 axis Geo-position Data Path 70 (CDMA, TDMA, NAMPS, GSM, VHF, UHF, etc.). The RF Transceiver 74 then converts the input data from the Voice/Data Signal De/Coder Module 78 into an RF transmission, at a frequency pre-determined by the manufacturer of said device. The data transmission is then emitted from the RF Transceiver Antenna 72, to the RCA 10 RF Transceiver Antenna 68 via the RF, Coded-Voice, Communication Control & 3 axis Geo-position Data Path 70. The signal received by the RF Transceiver Antenna 68 sends the signal to the RF Transceiver 66. The RF Transceiver 66 then converts the received signals to a format which is pre-determined by manufacturer of said RF Transceiver 66 and is usable by the Voice/Data Signal De/Coder Module 62, which receives the communication control data via the Coded-Voice, Communication Control and 3 axis Geo-position Data Input Path 100. The Voice/Data Signal De/Coder 62 uses a decoding algorithm, pre-programmed by the manufacturer of said Voice/Data Signal De/Coder 62 to re-assemble the received data into a format usable by the Tone Detection & Generation Module 48. The decoded communication control data is then sent to the Tone Detection & Generation Module 48 via the Decoded-Voice, Communication Control and 3 axis Geo-position Data Input Path 102. The communication control data is received by the tone diction function of the Tone Detection & Generation Module 48, and is then converted from an audio tone representation of the data to a format preset by the manufacturer of said Tone Detection & Generation Module 48, which is usable by the CPU 34 of the RCA 10. The communication control data is then received by the CPU 34 via the Communication Control & 3 axis Geo-position Data Input Path 50. Per the pre-programmed micro-code, the CPU 34 recognizes the communication control input data as a command to communicate 3 axis geo-position data to the NSA 12.

When an event trigger has been enabled (user activation input, or communication control input), the CPU 34 executes a set of instructions, to communicate 3 axis geo-position data. CPU 34 continues to receive, validate, and update the RAM with "Valid" data. CPU 34 samples said RAM 38, via the Valid 3 axis Geo-position Data Path 52, for current "Valid" 3 axis geo-position data. If 3 axis geo-position data from said SPS Data Processor 30 is "Not Valid", then the CPU 34 maintains, retrieves via the Valid 3 axis Geo-position Data Retrieval Path 54, and communicates the last "Valid" 3 axis geo-position data, until new "Valid" 3 axis geo-position data is obtained, and updated into RAM 38. If "Valid" data is not realized by the CPU 34 after a preset timeout condition has been achieved, the CPU 34 will default to communicating the "Not Valid" data.

During the sampling and communication of said "Valid" 3 axis geo-position data, the CPU 34 disables the 3 axis geo-position data validation process, so that existing "Valid" data is not corrupted, erased, or over-written during the sampling and communication sequence. However, during the transmission of "Not Valid" 3 axis geo-position data, the validation process continues, and in the event "Valid" 3 axis geo-position data is realized, the CPU 34 will interrupt the transmission of "Not Valid" 3 axis geo-position data, update the RAM 38 with "Valid" 3 axis geo-position data, and proceed to transmit the new "Valid" 3 axis geo-position data.

The CPU 34 sends the data to the Tone Detection & Generation Module 48 via the Communication Control & 3 axis Geo-position Data Transmit Path 46. The "Valid" geo-position data is then converted into an audio tone representation of the data by the tone generation function of the Tone Detection & Generation Module 48. This data is then forwarded to the Voice/Data Signal De/Coder Module 62 via the Communication Control 3 axis Geo-position Data Transmit Path 60. This device formats the audio tones into a data stream appropriate to the manufactures method of transmitting voice & data via the Radio Frequency (RF), Coded-Voice, Communication Control and 3 axis Geo-position Data Path 70 (CDMA, TDMA, NAMPS, GSM, VHF, UHF, etc.).

The Coded-Voice, Communication Control and 3 axis Geo-position Data is then sent to the Radio Frequency (RF) Transceiver 66 via the Coded-Voice, Communication Control and 3 axis Geo-position Data Path 64. The RF Transceiver 66 then converts the input data from the Voice/Data Signal De/Coder Module 62 into an RF transmission, at a frequency pre-determined by the manufacturer of said device. The data transmission is then emitted from the RF Transceiver Antenna 68, to the NSA 12 RF Transceiver Antenna 72 via the RF, Coded-Voice, Communication Control & 3 axis Geo-position Data Path 70. The signal received by the RF Transceiver Antenna 72 sends the signal to the RF Transceiver 74. The RF Transceiver 74 then converts the received signals to a format which is pre-determined by manufacturer of said RF Transceiver and is usable by the Voice/Data Signal De/Coder Module 78, which receives the data via the Coded-Voice, Communication Control and 3 axis Geo-position Data Path 76. The Voice/Data Signal De/Coder 78 uses a decoding algorithm, pre-programmed by the manufacturer of said Voice/Data Signal De/Coder 78 to re-assemble the received data into a format usable by the CTSS 134. The NSA 12 sends the uncorrected 3 axis geo-position data to the CTSS 134 via the Voice, Communication Control, and 3 axis Geo-position Data Path 132.

Depending on the communication circuit path, said CTSS 134 forwards the 3 axis geo-position data to the PBX 202 via the Voice, Communication Control, and 3 axis Geo-position Data Path 208, or sends the 3 axis geo-position data to the PSTN via the Voice, Communication Control, and 3 axis Geo-position Data Path 206, which in turn forwards said data to said PBX 202 via the Voice, Communication Control, and 3 axis Geo-position Data Path 204. Otherwise the communication data is sent to the PSTN 138 via the Voice, Communication Control and 3 axis Geo-position Data Path 206, which forwards the data on to said CRA 14 via the Voice, Communication Control, and 3 axis Geo-position Data Path 198.

The PBX 202 codes the 3 axis geo-position data, and forwards said data to the CRA 14 via the Voice, Communication Control, and 3 axis Geo-position Data Path 144. The 3 axis geo-position data received by the Voice/Data Signal De/Coder 196 uses a decoding algorithm, pre-programmed by the manufacturer of said Voice/Data Signal De/Coder 196 to re-assemble the received data into a format usable by the Tone Detection & Generation Module 148. The decoded 3 axis geo-position data is then sent to the Tone Detection & Generation Module 148 via the Decoded-Voice, Communication Control and 3 axis Geo-position Data Path 146. The 3 axis geo-position data received by the tone diction function of the Tone Detection & Generation Module 148, and is then converted from an audio tone representation of the data to a format preset by the manufacturer of said Tone Detection & Generation Module 148, which is usable by the CPU 152 of the CRA 14. The 3 axis geo-position data is then received by the CPU 152 via the Communication Control & 3 axis Geo-position Data Path 150. The CPU 152 sends the "Valid" 3 axis geo-position data to the 3 axis Geo-position Data Related Service Application 170 for processing, via the Communication Control & 3 axis Geo-position Data Input Path 168.

The preferred embodiment of the CRA 14 uses a similar implementation as the NSA 12, of embedded, or connected SPS devices to the CRA 14. The use of 3 axis geo-position data from said devices, however, is for the purposes of correcting the "built-in" error of the SPS Transmission Data 22 as further described below.

A presently preferred implementation of the SPS Receiver Antenna 154 is embedded within the CRA 14, is capable of receiving a specific range of SPS Data Transmissions, and can operate within a wide range of operating environments. The Antenna 154 is connected to said SPS Receiver Chip 156 as specified by the SPS Receiver Antenna manufacturer and the SPS Receiver Chip 156 manufacturer.

The preferred implementation of said SPS Receiver Chip 156 is as currently exists in the present embodiment of the invention. SPS signals are received by said SPS Receiver Chip 156 from said SPS Receiver Antenna 154, and is converted into "raw", or non-formatted, binary SPS data streams, which are then passed on to said SPS Data Processor 160, via said Raw SPS Data Output Path 162. Further details of the CRA SPS receiver components and operation are analogous to the corresponding circuits in the RCA and or the NSA and therefore will be abbreviated here.

The CPU 152 is instructed by the 3 axis Geo-position Data Related Service Application 170 to perform a validation on the formatted 3 axis geo-position data input. If the 3 axis geo-position data is found to be "Valid", the CPU 152 will send the 3 axis geo-position data to the 3 axis Geo-position Correction Database 166 for future input to a 3 axis geo-position error correction algorithm, via the 3 axis Geo-position Correction Database Record Input Path 164.

The 3 axis Geo-position Data Related Service Application 170 receives the 3 axis geo-position data communicated by the RCA 10, and performs a validation on the received data. If the data is corrupt, the 3 axis Geo-position Data Related Service Application 170 will transmit a communication control command back to the RCA 10, to send 3 axis geo-position data. Upon receipt of validated 3 axis geo-position data from the RCA 10, the 3 axis Geo-position Data Related Service Application 170 examines the time-stamp of the received 3 axis geo-position data from the RCA 10. The said application 170 then queries the 3 axis Geo-position Correction Database via the Database Query Path 172 to return a 3 axis geo-position correction record with the same time-stamp via the Database Record Return Path 174.

The 3 axis Geo-position Data Related Service Application implements an error correction algorithm which utilizes two dynamically updated variable data inputs, and a user defined variable data input. The user defined variable data input represents a professionally surveyed, or bench-marked 3 axis geo-position of the CRA 12. This 3 axis geo-position represents a known location from which to reference deviations of correlated SPS Transmission Data 22. The first dynamic variable data input is the 3 axis geo-position received by the local SPS Data Processor 160, and connected SPS devices, which is stored in said 3 axis Geo-position Correction Database 166. This data represents the correlated 3 axis geo-position of the CRA 14, and is used in conjunction with the user defined variable, to calculate a 3 axis geo-position deviation factor from the known, or bench-marked 3 axis geo-position. The second dynamic variable data input is the "Valid" 3 axis geo-position data received from the RCA 10. This data represents the correlated 3 axis geo-position of the RCA, and is used in conjunction with the computed 3 axis geo-position deviation factor, in order to calculate a corrected 3 axis geo-position of said RCA 10.

After performing an error correction on the RCA 10 3 axis geo-position, the 3 axis Geo-position Data Related Service Application 170 then forwards the 3 axis geo-position data to a 3 axis Geo-position Relational Database Service 178, via the Corrected 3 axis Geo-position Data Input Path 176. This service 178 utilizes the corrected 3 axis geo-position data of the RCA 10, in order to return a pre-determined data record via the 3 axis Geo-position Relational Data Output Path 180, relative to the 3 axis geo-position communicated by the RCA 10, which would enable the user of said CRA 14 to perform a 3-axis geo-position related service for user of said RCA 10, or user of said CRA 14, based on the 3 axis geo-position relational data input to said Geo-position Data Related Service Application 170. In some cases, said 3 axis Geo-position Relational Database Service 178 may never return a 3 axis geo-position relational data record to the 3 axis Geo-position Data Related Service Application 170, but instead would store the 3 axis geo-position of said RCA 10, for future processing, or communication to services outside the realm of this invention.

In the present embodiment of this invention, the user of said CRA 14 interacts with said application 170 by entering data variables into said application 170 via the User Activation Interface 188. A variety of inputs, similar to those of the RCA can be utilized to provide data input to either change operational characteristics of the CRA, or change event trigger parameters. In the case of a person attended CRA 14, feedback is provided to the user via a connected User Display Interface 186. Those 3 axis geo-position data related services which require the user of said CRA 14 to view the 3 axis geo-position relational data results, utilize the application 170 to drive said 3 axis geo-position relational data results to the CPU 152, which in turn forwards the data to said User Display Interface via the Communication Control & 3 axis Geo-position Related Data Display Output Path.

The 3 axis Geo-position Data Related Service Application 170 performs the primary function of receiving 3 axis geo-position data from a Remote Communication Apparatus 10, or said Network Service Apparatus 12, and enable the user of said 3 axis Geo-position Data Related Service Application 170 to perform a service for user of said RCA 10, and said CRA 14. 3 axis geo-position related applications may include but not be limited to; asset tracking, personnel and fleet management, directory assistance, concierge services, process control, personal location, public safety location services, navigation, telecommunication network management, and so forth.

Location Data Correction

As mentioned briefly above, an important aspect of the invention is a method and apparatus for correcting SPS-derived location data received from a remote communication device such as a cell phone. It is known that certain degradation of satellite signals leads to inaccuracies in acquired position information. (The-GPS apparently provides more accurate information to the military, NASA, etc. but not to the public.) The present invention provides a solution for overcoming these inaccuracies to provide precise location data.

The correction technique is implemented at a fixed location, which can be virtually anywhere that GPS signals are visible for reception. In one embodiment of the invention, that fixed location is a part of the communications network, for example at a cell site, CTSS, telephone central office, etc. In another embodiment, the fixed location can be a home, office or other place of business, and in particular the fixed location can be a PSAP. It is advantageous for many applications to provide the fixed location within the communications network where a cell call, particularly an emergency or 911 call, is routed, so that location-based routing can be accomplished with enhanced accuracy as further explained below.

Thus another feature of the invention provides for dynamic routing of a call, for example an emergency 911 call, based on highly accurate, corrected location data. This ensures that the most appropriate emergency or public safety services provider receives needed information as quickly as possible. A location error of a few meters, for example, can make the difference between dispatching a call to local police or to highway patrol where the precise emergency location is actually on an urban highway. On the coast highway, as another example, only a few meters may mean the difference between the need for land-based ambulance or a distress call to the Coast Guard for a water rescue.

Figure 14:
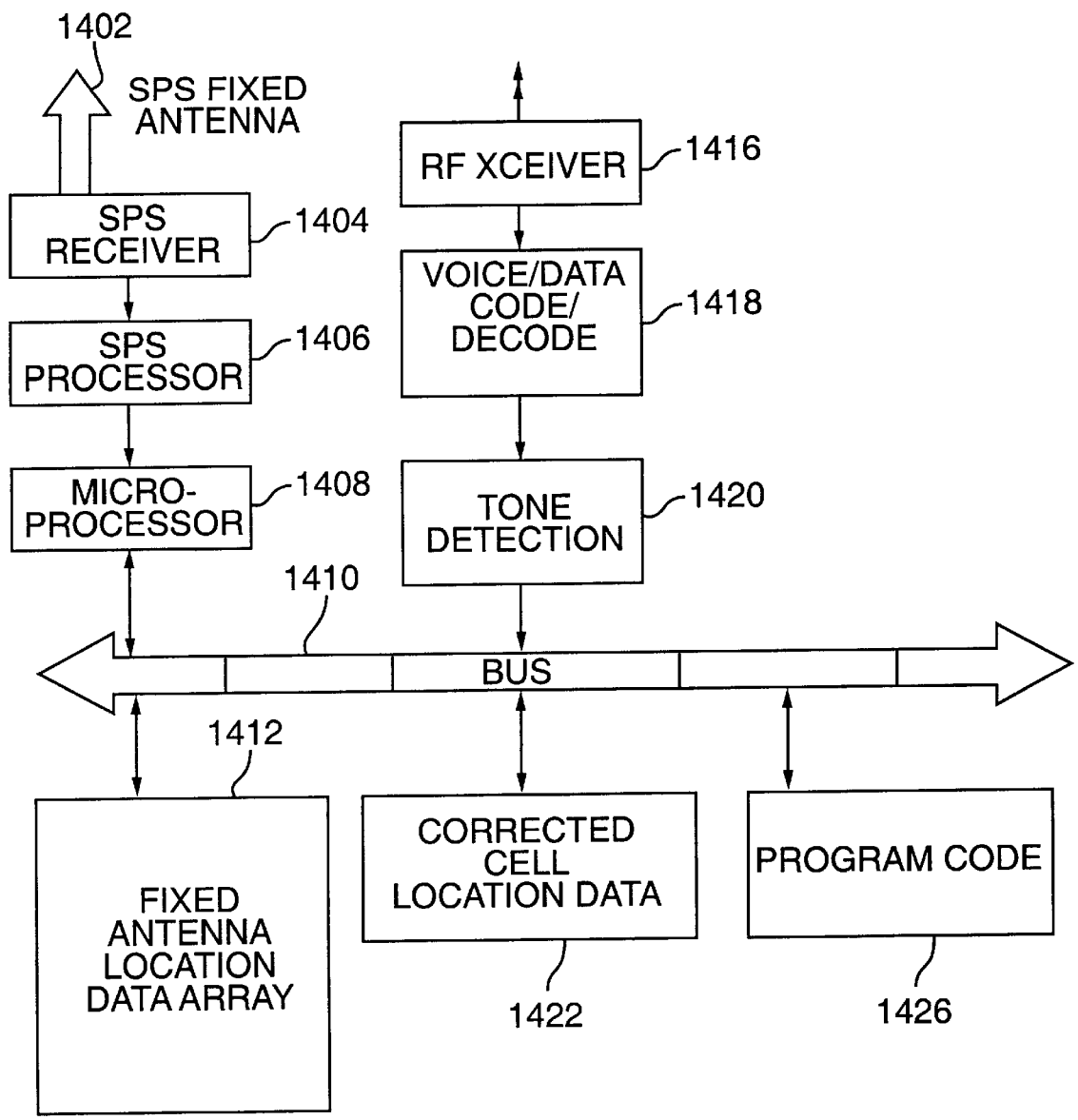
FIG. 14 is a simplified block diagram of a hardware architecture that can be used to implement SPS location error correction.

Referring now to FIG. 14, to provide location data correction, an SPS antenna 1402 is installed at the fixed location. The actual physical location of that antenna is accurately determined, for example by survey, and recorded in memory. An SPS receiver 1404 is coupled to the fixed antenna, and SPS location data of the fixed antenna is acquired and processed in an SPS processor 1406. The processor 1406 provides output data comprising a time stamp, latitude, longitude and altitude data, for example as an ASCII stream of bytes in a pre-determined format. Commercially available SPS receivers and processors can be programmed to provide a desired output format, for example over a serial port. This data is updated frequently, for example every few seconds. (This data can be expected to suffer from the "selective availability" degradation built into SPS transmissions.) The acquired fixed antenna position data is delivered to a system microprocessor 1408 and stored (via bus 1410) in a memory. The data is stored in the memory so as to form a dynamic or circular array so that, for example, the most recent 60 seconds of data is maintained at all times. If data is acquired say, every 1 second on average, there will be sixty samples in the array, although this number is not critical. Memory space is provided as appropriate.

Figure 15:
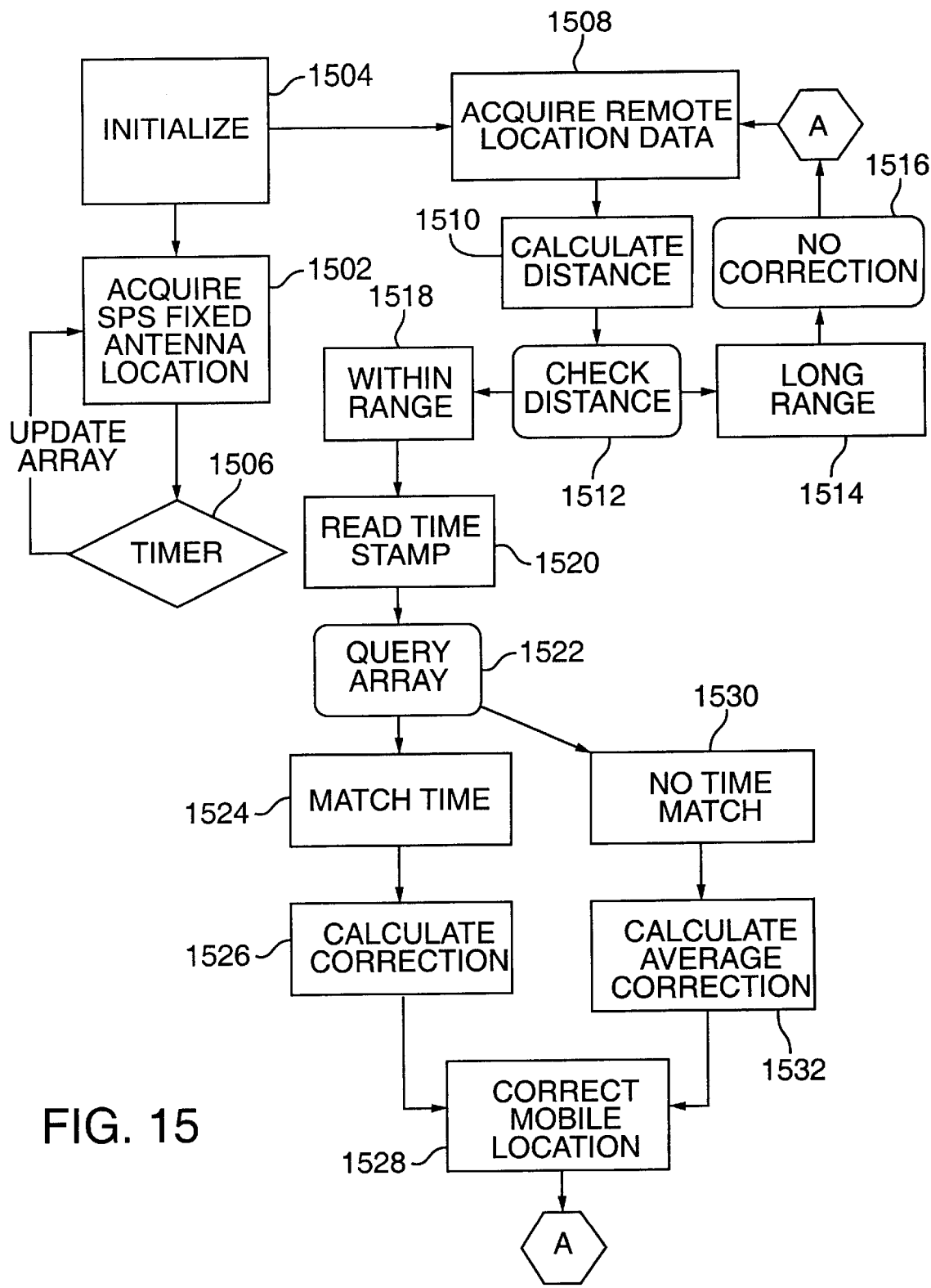
FIG. 15 is a flowchart of a process of correcting SPS location data.

An RF receiver or transceiver 1416 for cell telephone reception is coupled to a voice/data code and decode module 1418 to decode incoming signals into digital data. This data is input to a tone detection module 1420 to detect the audio tones that represent the cell phone location. The resulting data, further processed by the microprocessor 1408 if necessary, to form the cell location data sample preferably comprising a time stamp, latitude, longitude and altitude. The cell location data sample is stored, for example in a memory location 1422 via bus 1410. Program code for execution by the microprocessor to carry out these operations can be provided in a memory 1426, preferably a read-only memory. The stored cell location data is corrected according to the following methodology. Referring now to FIG. 15, a process of correcting the cell location data begins with acquisition of location data 1502 from the fixed SPS antenna (1402 in FIG. 14), responsive to an initialization step 1504. While at first blush it may seem odd to acquire SPS location data at a known, fixed location, the utility of doing so will become apparent. The acquired fixed antenna location data (after the usual processing, not shown) is stored in an array of memory as noted above. Periodically, for example as indicated by checking a programmable timer (or by hardware interrupt, etc.), new location data is acquired and the array is updated. This process 1502, 1506 is repeated so that an array of location data is maintained, reflecting the most recently acquired data, for example over a period of 60 seconds.

Next, SPS-derived location data is received 1508 from a remote wireless apparatus, as mentioned with reference to FIG. 14. Based on the latitude and longitude (and optionally altitude as well) indicated in the received data, a distance of the wireless apparatus to the fixed location is calculated 1510. That distance is compared to a pre-determined range, say 100 kilometers, step 1512. If the calculated distance exceeds the selected range, 1514, no correction is applied to the received data 1516, and the process loops via "A" to acquire new data from the remote apparatus. This is done because where the distance is great the probability increases that satellites in view at the remote location are not the same as the satellites in view at the fixed location at the same time.

If the calculated distance is within the selected range, step 1518, the time stamp of the remote location data sample is read 1520, and the memory array containing the fixed antenna location data is interrogated 1522 to see if a sample having the same time stamp value is in the array (indicating a "fix" on the fixed location was acquired at the same time as the "fix" was acquired on the remote apparatus). If a matching time stamp is found in the array 1524, that data is used to calculate a 3-axis correction factor, step 1526, calculated as the difference in each of the three dimensions, as between the selected fixed antenna location data sample, and the known, actual location of the fixed antenna. This difference indicates the effective errors in the satellite transmitted data, for that fixed location, at the exact time the remote location data was acquired by the remote apparatus. The timing is critical because the satellite degradation is not static. The next step 1528 is correcting the remote location data by applying the calculated corrections. Then the process loops to "A" to acquire new location data from the remote object. The described process thus reverses the "selective availability" signal degradation of the SPS. When a matching time stamp is found, an application can confidently expect location accuracy within 10 meters.

If the calculated distance is within correction range, but no matching time stamp is found in the array of fixed antenna location samples, 1530, a correction factor can still be calculated by averaging the corrections over all of the samples in the array, step 1532. This will provide a useful approximation, as it is highly likely that the remote data was acquired within the past 60 seconds, during which the fixed antenna data was also acquired.

In a presently preferred embodiment, the error correction can be provided in a Network Service Apparatus (NSA) 12, as described earlier with reference to FIG. 7. In FIG. 7, the geo-position correction database 210 stores the array of fixed antenna location data samples described above. The CPU 86 of FIG. 7 corresponds to the microprocessor 1408 of FIG. 14; the SPS data processor 110 of FIG. 7 corresponds to the SPS processor 1406 of FIG. 14, and so forth.

In the alternative, or in addition, the error correction can be implemented in the call taker CRA, as illustrated in FIG. 8. In this case, the geo-position correction database 166 stores the array of fixed antenna location data samples described above. The CPU 152 of FIG. 8 corresponds to the microprocessor 1408 of FIG. 14; the SPS data processor 160 of FIG. 8 corresponds to the SPS processor 1406 of FIG. 14, and so forth.

In our previously filed patent applications, we disclosed an improved system and method to communicate time stamped (time as UTC), 3-axis (X as Latitude, Y as Longitude, and Z as Altitude) geo-position data of a remote communication apparatus, through the audio traffic channel of a telecommunication network, to a network service and/or call receiver apparatus capable of receiving 3 axis geo-position data, and in turn performing a 3 axis geo-position relational service for the user of each apparatus. The present invention provides huge cost savings, for example in the public safety or emergency response sectors (dial 911 in the U.S.) by using the existing cell telephone network infrastructure, combined with a global positioning system, and several novel enhancements, to provide precise user location information.

We further described previously a wireless system for voice and data communications, such as a Personal Communication System (PCS), in which latitude-longitude-altitude (3 axis) location is embedded in the communications signals of the communication system for the determination of the location of the PCS user by a Satellite Positioning System (SPS), such as the Global Positioning System or Global Orbiting Navigational Satellite System. In each such embodiment, the apparatus includes a plurality of antenna, a power supply, a device to process the SPS data, a communications device, and a remote display unit connected by a wireless link.

Figure 10A:
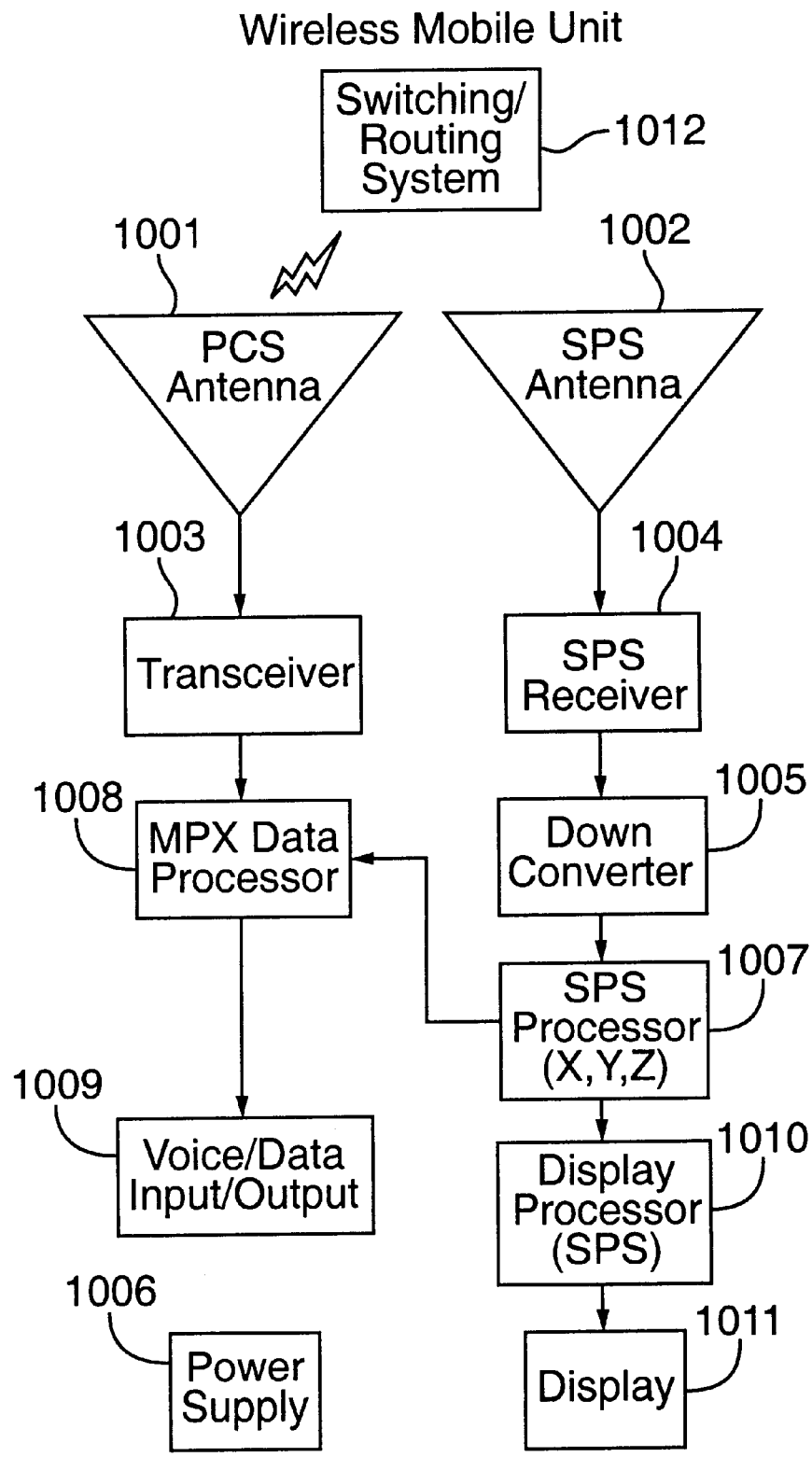
FIG. 10A is a simplified block diagram of a first alternative wireless mobile unit.

The previous applications illustrated a mobile system (FIG. 10A), in which the PCS/SPS device includes an SPS antenna 1002 and receiver 1004 to receive the SPS signals; an SPS signal frequency downconverter 1005; an SPS signal processor 1007 to receive converted antenna output signals and process them to provide a present location and altitude of the PCS/SPS user as well as the time of observation; a display processor 1010 and display 1011; a transceiver 1003 to receive processor output signals and transmit these signals through an antenna 1001 as a multiplexed 1008 data packet along with the voice/data stream inputs 1009; and a power supply 1006.

Figure 12:
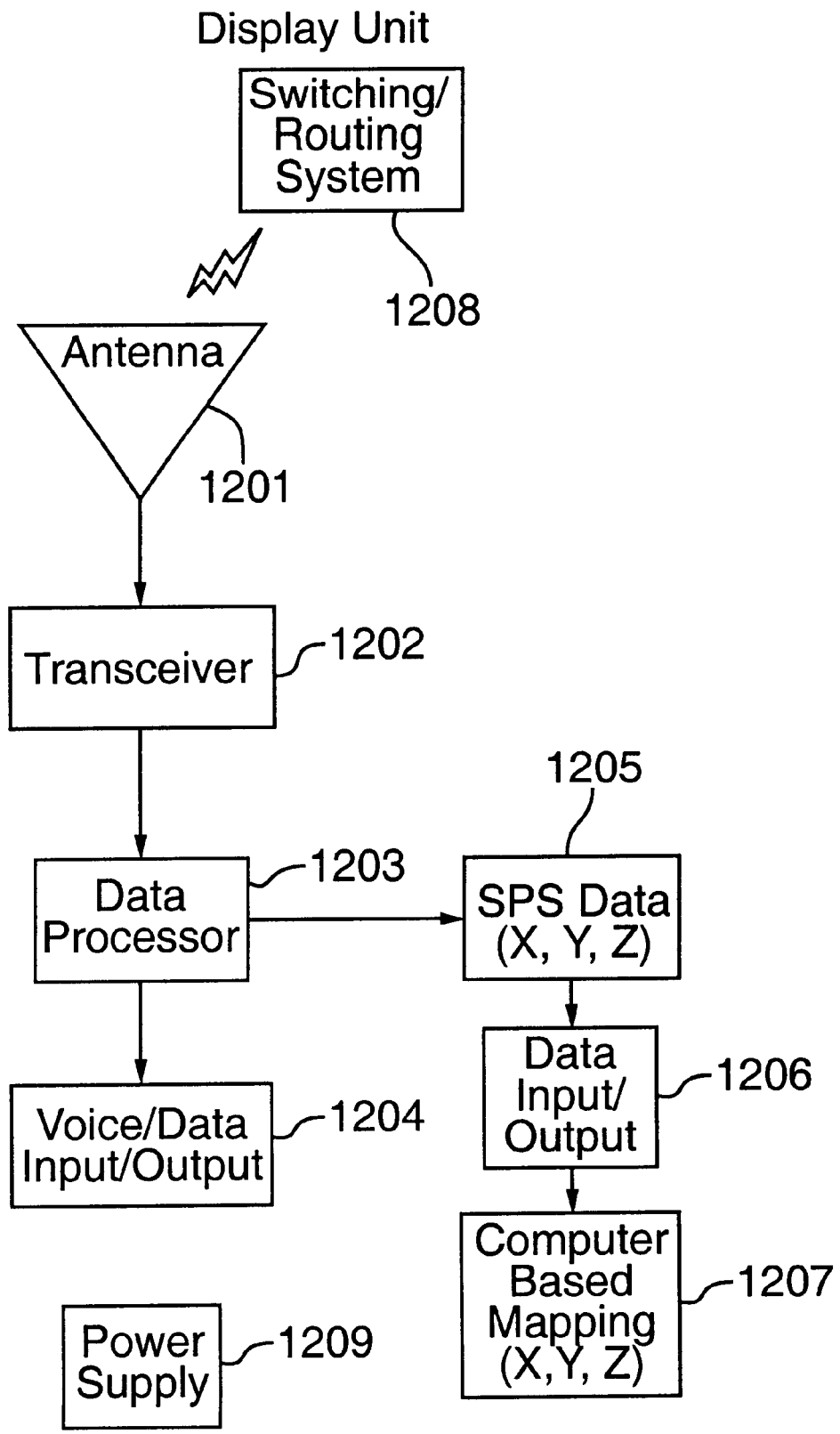
FIG. 12 is simplified block diagram of a display unit, which can be mobile or stationary, for indicating location of a remote unit on a map display.

The display unit (FIG. 12) includes an antenna 1201; a transceiver 1202 to receive the signals transmitted by the PCSISPS mobile system transceiver; a computer based processor 1203 to receive and demultiplex output signals from the receiver; a voice/data input output system 1204; an SPS data buffer 1205; a data output system 1206; a system to display location by a computer based mapping system 1207; and a power supply 1209. We thus disclosed wireless switching and routing functionality with embedded 3 axis location data, either by terrestrial or satellite wireless systems.

We earlier described wireless systems that transmit voice and data communications, such as a Personal Communication System (PCS), cell phone or radio, in which latitude-longitude-altitude (3 axis) location is added to the system for the express purpose of embedding data packets or streams in the communications signals of the communication system for the determination of the location of the PCS user by a Satellite Positioning System (SPS), such as the Global Positioning System or Global Orbiting Navigational Satellite System. In each embodiment, the apparatus includes a plurality of antenna, a plurality of power supplies, a device to process the SPS data, a communications device, a communications link and a remote display unit connected by a wireless link.

Figure 10B:
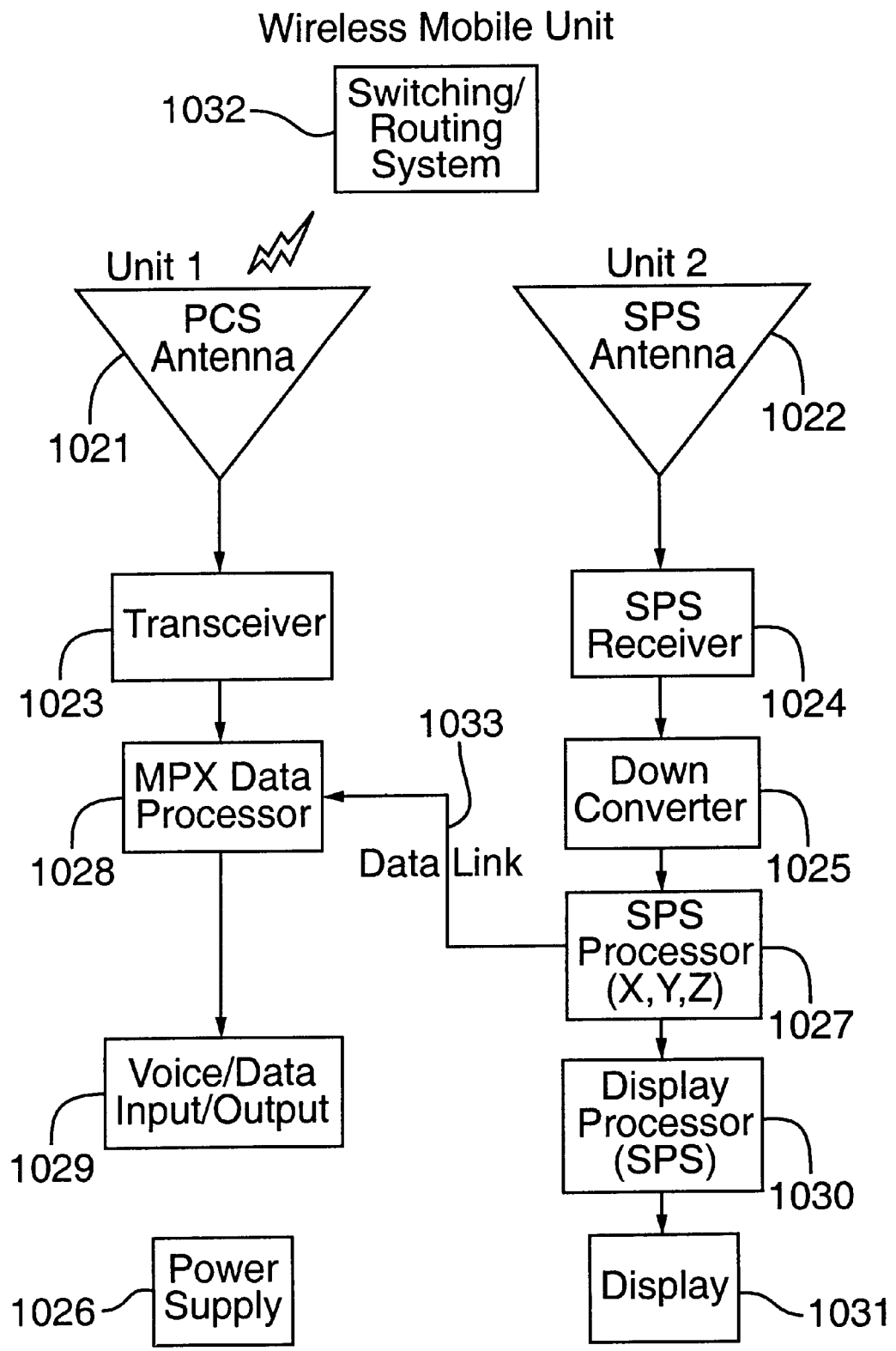
FIG. 10B is a simplified block diagram of a second alternative wireless mobile unit.
Figure 10C:
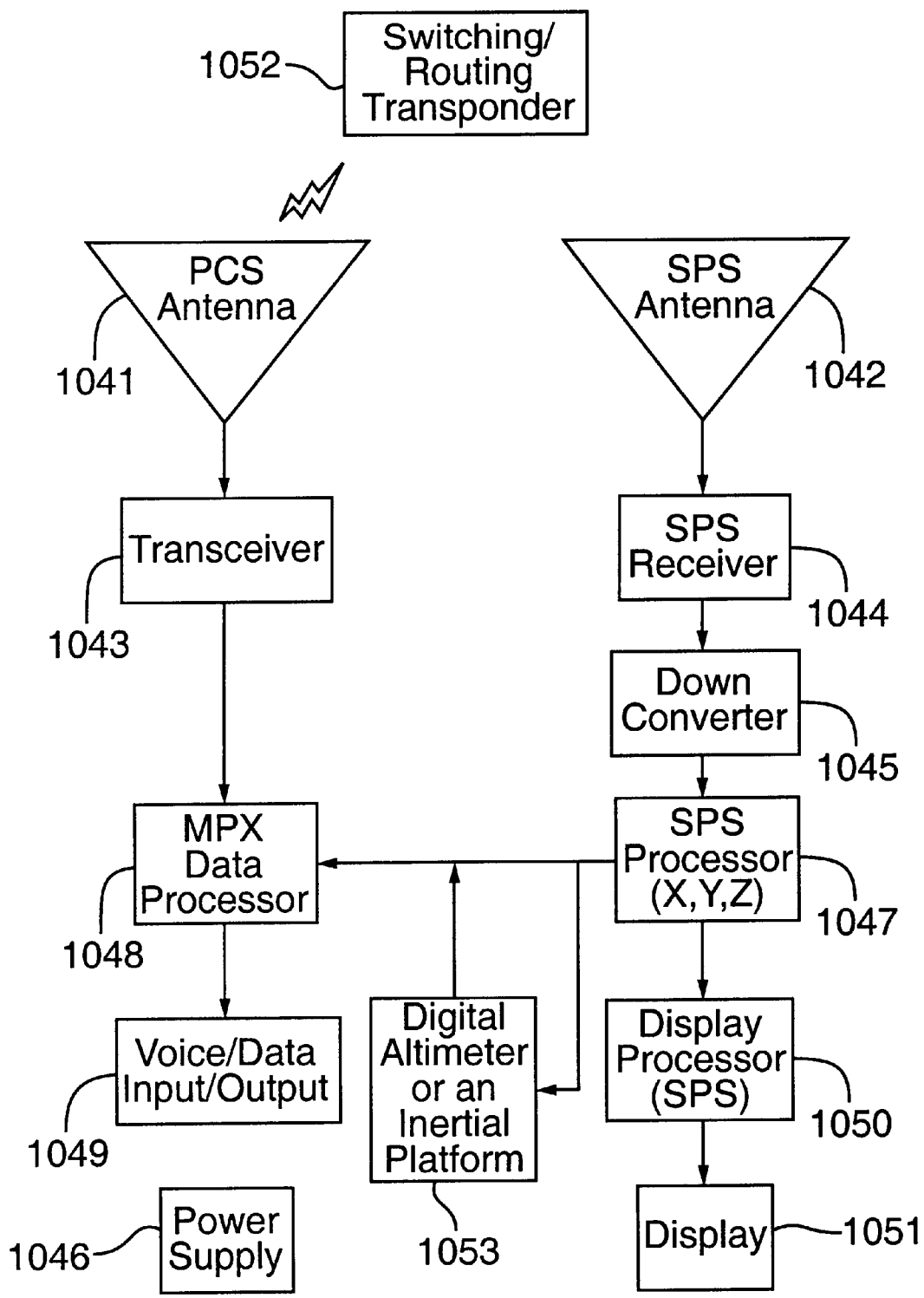
FIG. 10C is a simplified block diagram of a third alternative wireless mobile unit.
Figure 10D:
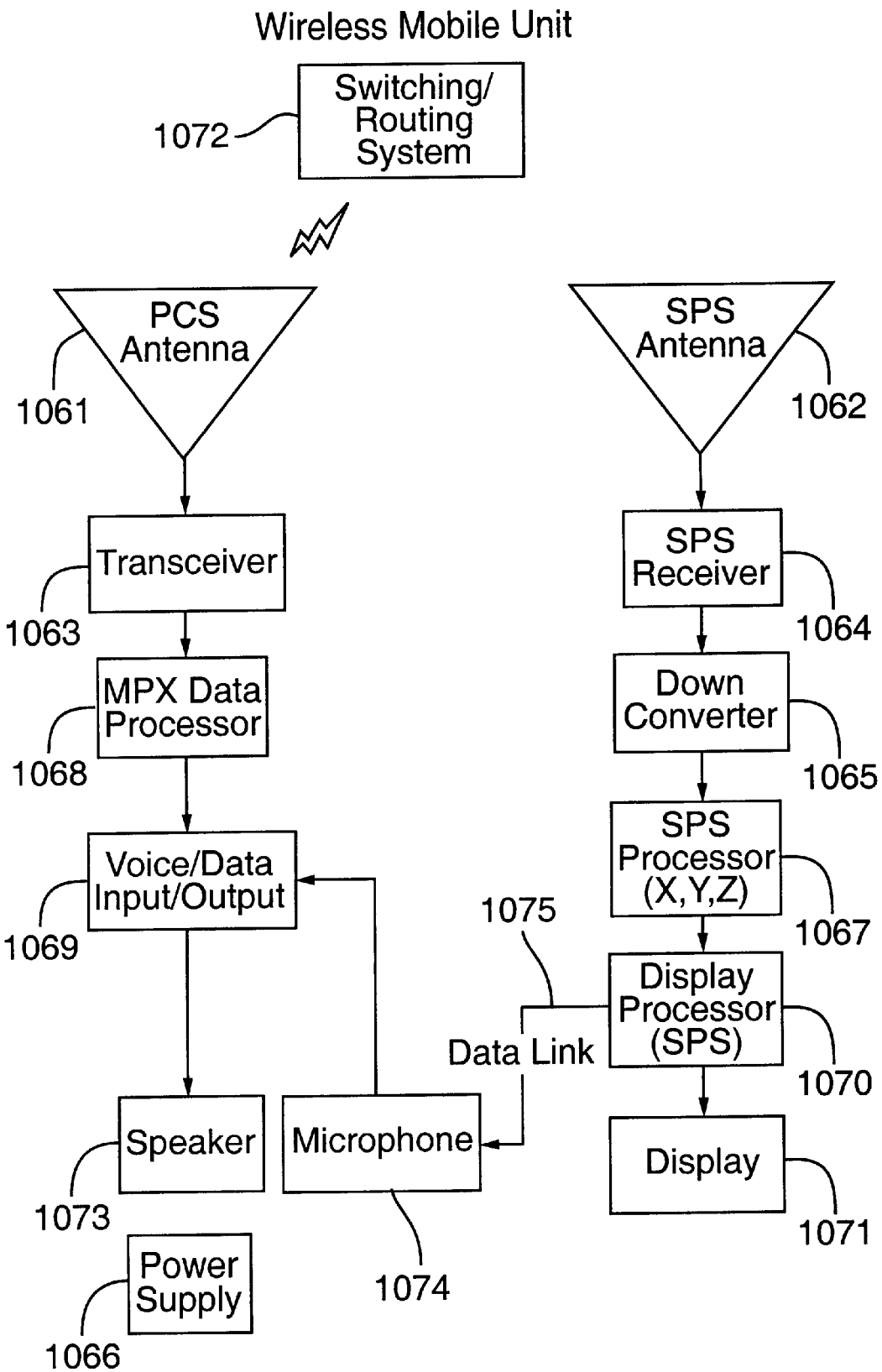
FIG. 10D is a simplified block diagram of a fourth alternative wireless mobile unit.

We illustrated mobile systems as in FIG. 10B, in which the SPS (unit 2) supplies a data stream (e.g. NMA) to the PCS (unit 1) by a communications link to a signal multiplexer 1028. Mobile unit 2 includes an SPS antenna 1022 and receiver 1024 to receive the SPS signals; an SPS signal frequency downconverter 1025; an SPS signal processor 1027 to receive converted antenna output signals and process them to provide a present location and altitude of the PCS/SPS user as well as the time of observation; a display processor 1030 and display 1031. Unit 1 includes a transceiver 1023 to receive processor output signals and transmit these signals through an antenna 1021 as a multiplexed 1028 data packet along with the voice/data stream inputs 1029; and a power supply 1026. In a second embodiment, the SPS is located in the voice input (microphone) housing and the data stream is embedded in or included as a data packet in the voice stream. FIG. 10D shows another embodiment.

A wireless system for voice and data communications, such as a Personal Communication System (PCS), in which latitude-longitude-altitude (3 axis) location is embedded in the communications signals of the communication system for the determination of the location of the PCS user by a Satellite Positioning System (SPS), such as the Global Positioning System or Global Orbiting Navigational Satellite System. In the event of loss of positioning signal, an initial platform such as a Solid State Rotation Sensor like Gyro-Chip™ or equal, to maintain two dimensional changes in geographic location. In each embodiment, the apparatus includes a plurality of antenna, a power supply, a device to process the SPS data, an inertial platform, a communications device, and a remote display unit connected by a wireless link.

In an alternative embodiment of the mobile system (FIG. 10C) the PCS/SPS device includes an SPS antenna 1042 and receiver 1044 to receive the SPS signals; an SPS signal frequency downconverter 1045; an SPS signal processor 1047 to receive converted antenna output signals and process them to provide a present location and altitude of the PCS/SPS user as well as the time of observation; an inertial platform 1053 to update two dimensional location in the event of signal loss; a display processor 1050 and display 1051; a transceiver 1043 to receive processor output signals and transmit these signals through an antenna 1041 as a multiplexed 1048 data packet along with the voice/data stream inputs 1049; a power supply 1046; and a switching routing transponder 1052.

The display unit (FIG. 12) includes an antenna 1201; a transceiver 1202 to receive the signals transmitted by the PCS/SPS mobile system transceiver; a computer based processor 1203 to receive and demultiplex output signals from the receiver, a voice/data input output system 1204; an SPS data buffer 1205; a data output system 1206; a system to display location by a computer Based mapping system 1207; and a power supply 1209.

That embodiment employs the inertial platform's ability to accurately update a user's location during periods of signal loss. The invention is useful in the wireless communications market for accurately updating, tracking and locating the user during an SPS data loss.

Another wireless system for voice and data communications, such as a Personal Communication System (PCS), is illustrated in which latitude-longitude-altitude (3 axis) location is embedded in the communications signals of the communication system for the determination of the location of the PCS user by a Satellite Positioning System (SPS) such as the Global Positioning System or Global Orbiting Navigational Satellite System in the event of loss of positioning signal, a barometric pressure transducer and signal processor (digital altimeter), to maintain altitude changes in geographic location. In each embodiment, the apparatus includes a plurality of antenna a power supply, a device to process the SPS data, a digital altimeter a communications device, and a remote display unit connected by a wireless link.

In another alternative embodiment of the mobile system (FIG. 10C), the PCS/SPS device includes an SPS antenna 1042 and receiver 1044 to receive the SPS signals; an SPS signal frequency downconverter 1045; an SPS signal processor 1047 to receive converted antenna output signals and process them to provide a present location and altitude of the PCS/SPS user as well as the time of observation; a digital altimeter 1053 to update altitude in the event of signal loss; a display processor 1050 and display 1051; a transceiver 1043 to receive processor output signals and transmit these signals through an antenna 1041 as a multiplexed 1048 data packet along with the voice data stream inputs 1049; a power supply 1046; and a switching routing transponder 1052.

The display unit (FIG. 12) includes an antenna 1201; a transceiver 1202 to receive the signals transmitted by the PCS/SPS mobile system transceiver; a computer based processor 1203 to receive and demultiplex output signals from the receiver; a voice data input output system 1204; an SPS data buffer 1205; a data output system 1206; a system to display location by a computer based mapping system 1207; and a power supply 1209. This system employs the digital altimeter's ability to accurately update a users location during periods of signal loss.

Figure 11:
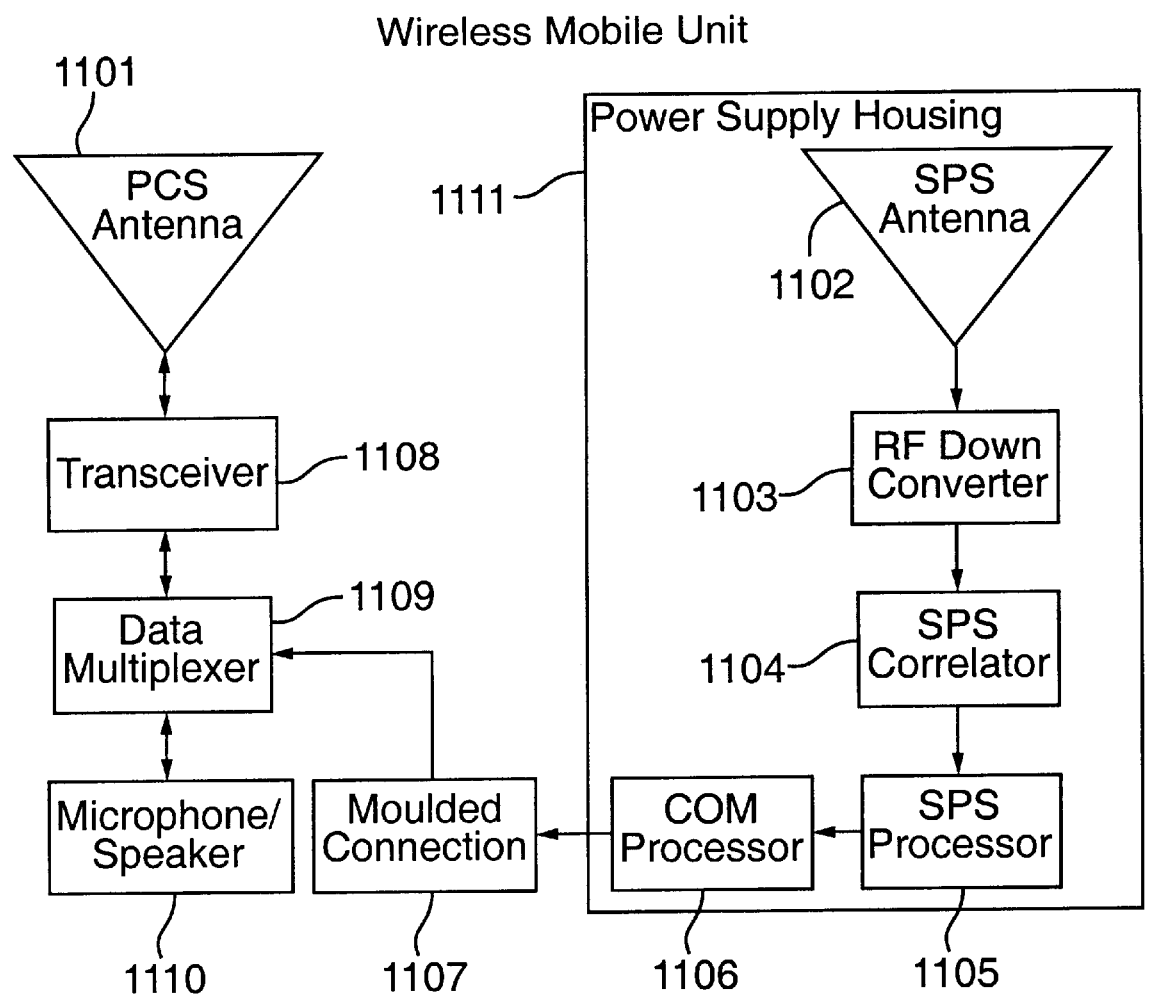
FIG. 11 is a simplified block diagram of a fifth alternative wireless mobile unit.
Figure 13A:
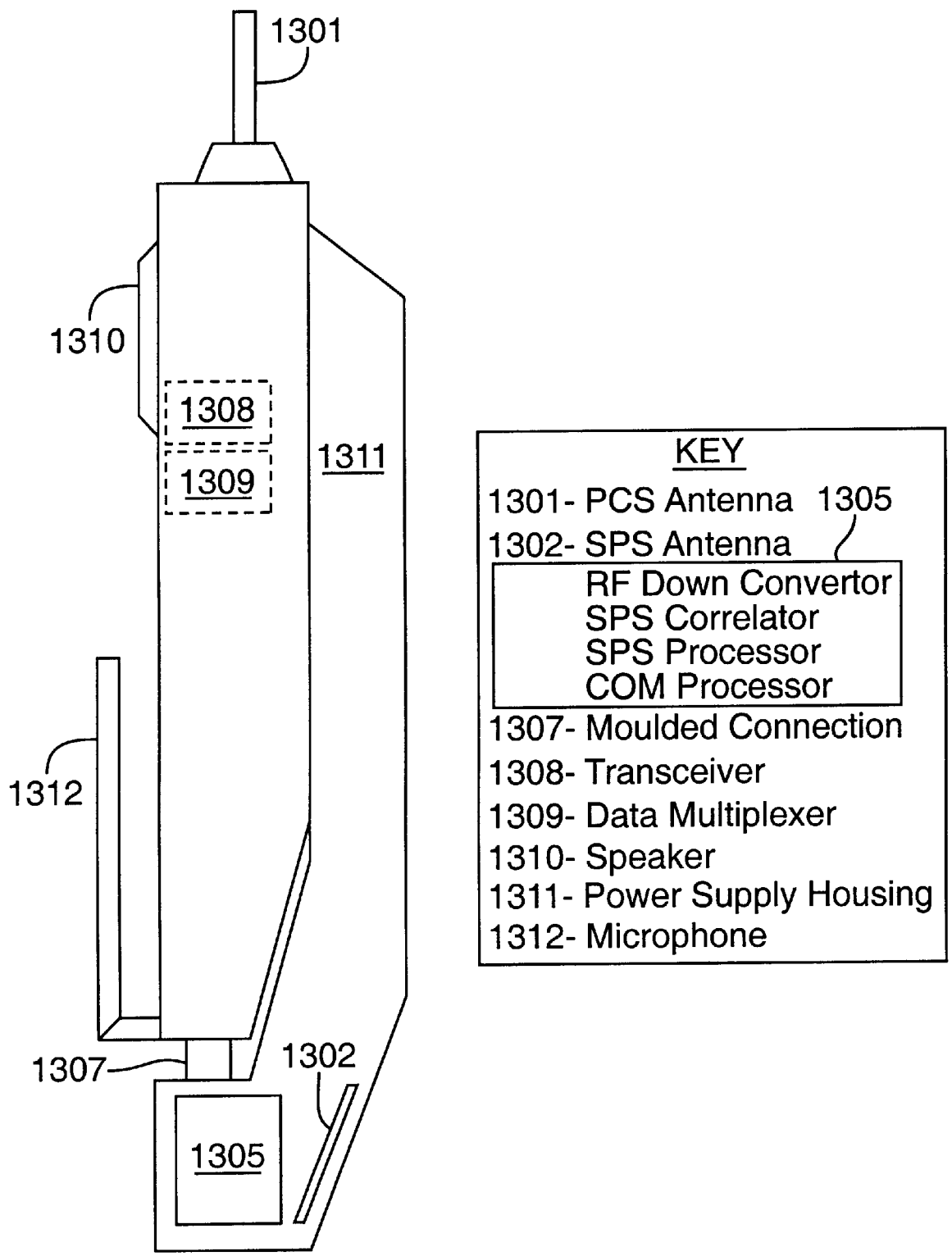
FIG. 13A is a cross-sectional view of an example of a wireless mobile unit whereby the SPS is disposed within the power supply housing.
Figure 13B:
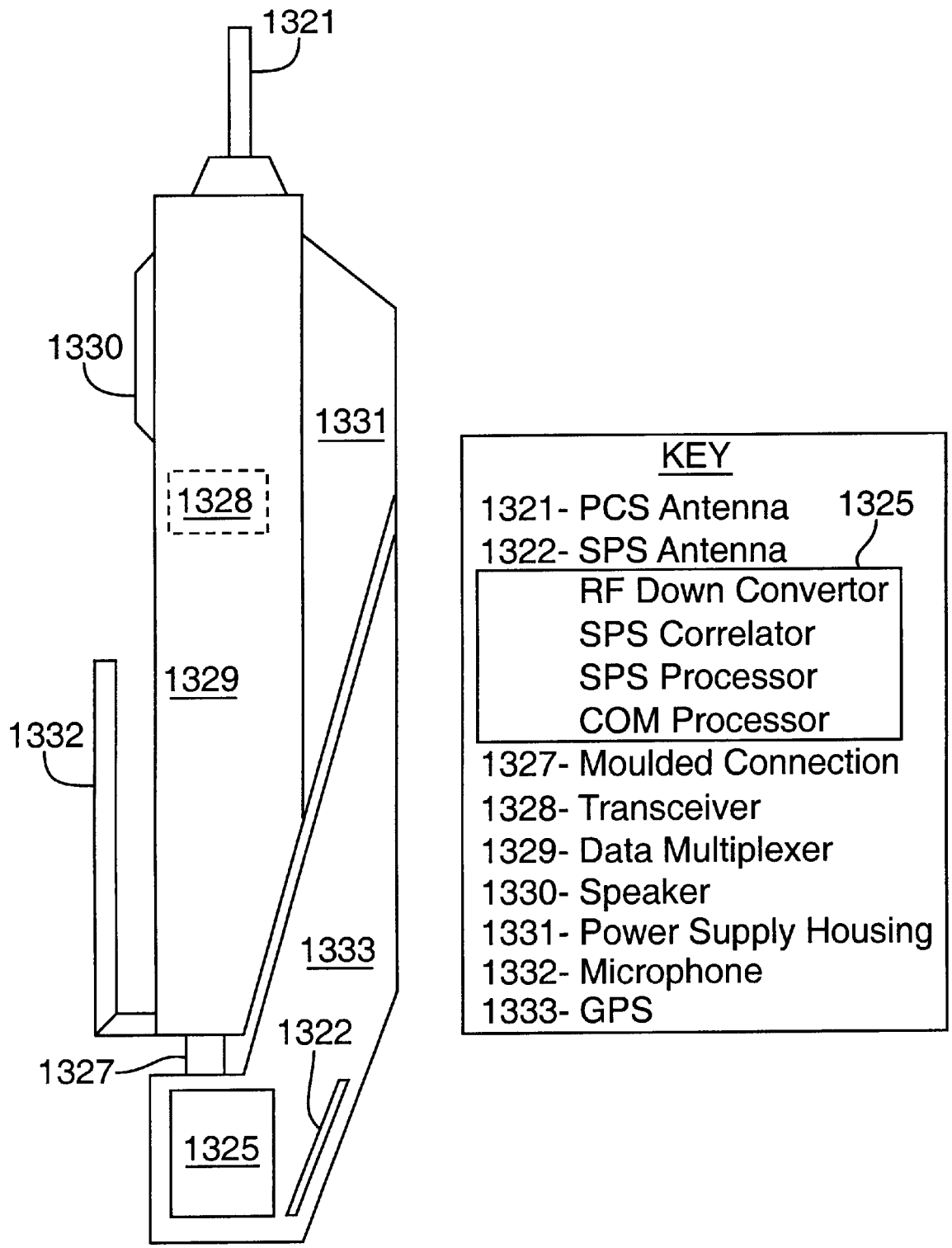
FIG. 13B is a cross-sectional view of an example of a wireless mobile whereby the SPS is on the power supply housing.

Referring now to FIG. 13, we illustrated an implementation for existing wireless mobile systems, E.g. Motorola Cellular Micro Tac Ultra Lite, Ericcson 338, etc. (FIG. 13A), that transmits voice conventionally or data communications through a port in the wireless device 1307. Referring to FIG. 11, the SPS system is external to the wireless mobile unit; the apparatus includes a plurality of antenna 1101 and 1102, an SPS Radio Frequency front end or down converter 1103, a multi-channel SPS correlator with support functions and crystal clock 1104, an SPS Processor 1105, communications processor 1106, data connection to the existing wireless mobile systems 1107, data multiplexer or logic device 1109, a transceiver 1108, speaker/microphone assembly 1110, a power supply which contains a rechargeable battery and components 1102–1106, and a wireless infrastructure that carries and routes the traffic channel. Additionally, in each embodiment, the data which includes latitude-longitude-altitude (3 axis) location is added to the system for the express purpose of embedding data packets or modulated data streams into the traffic channel of the communication system. In the embodiment of FIG. 13A, the SPS is located within the power supply housing. In the alternative embodiment of FIG. 13B, the SPS is located on the power supply housing.

Figure 13C:
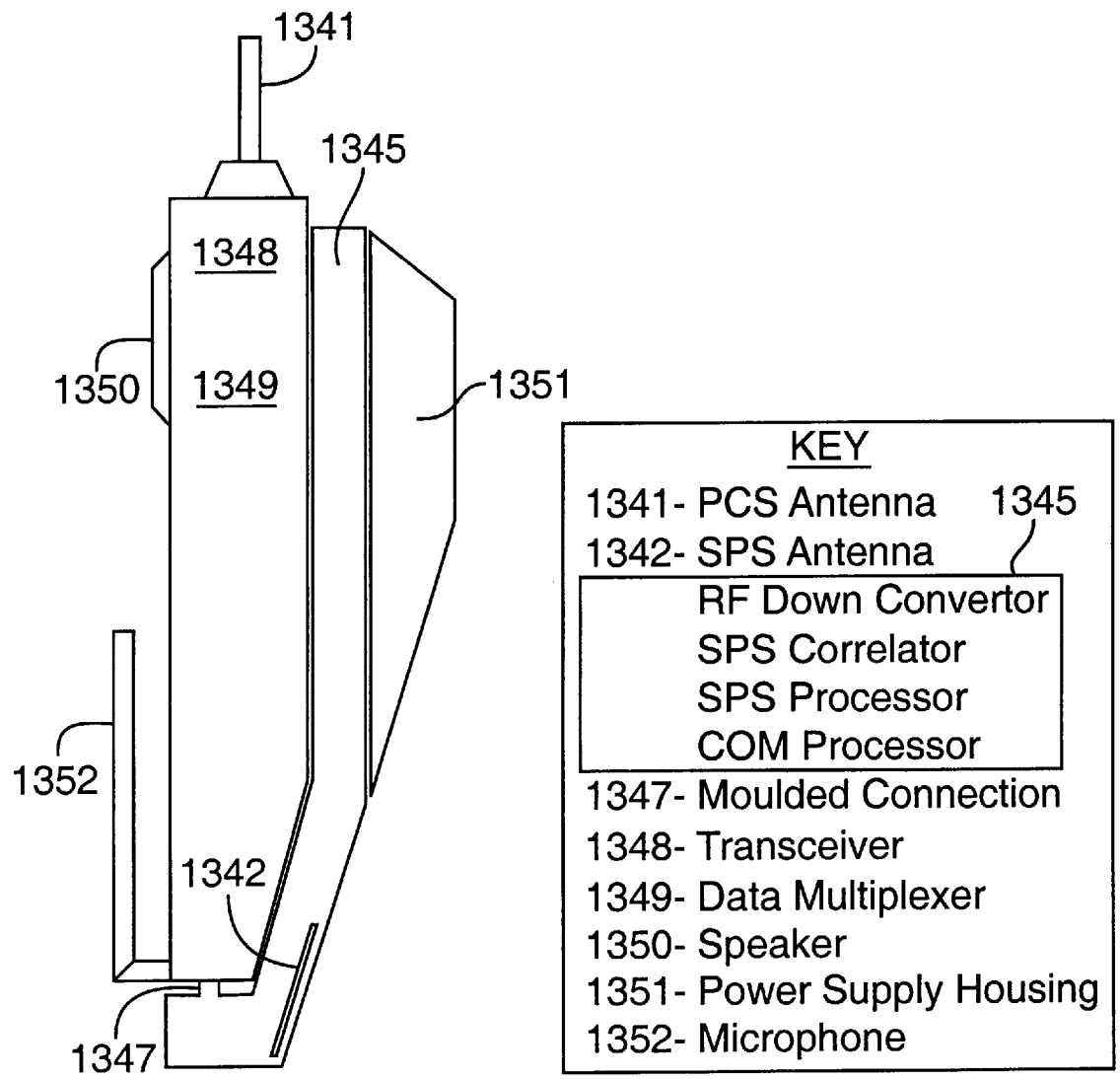
FIG. 13C is a cross-sectional view of an example of a wireless mobile in which the SPS is located under the power supply housing.

Referring to FIG. 13, we described earlier the placement of the SPS system in, on or under the power supply 1331, removable battery, with data transfer through an integrated molded electrical connection manufactured to mate to the existing data port 1327, a secondary data port in parallel with the original on the SPS device can be added if required, in order to maintain manufactures design functionality. Further, this transmission which contains the embedded 3 axis location data, will be conveyed by terrestrial or satellite wireless systems in the traffic channel (voice). FIG. 13C shows another alternative application.

Having illustrated and described the principles of our invention, it should be readily apparent to those skilled in the art that the invention can be modified in arrangement and detail without departing from such principles. We claim all modifications coming within the spirit and scope of the accompanying claims.

What is claimed is:

1. A remote communications apparatus for voice and data communication exclusively over the audio traffic channel of a digital wireless telecommunication network comprising:
    a source for generating digital data;
    a tone generation module for encoding the digital data into a series of audio frequency tones; the audio fragment tones being selected so as to avoid frequencies that are characteristic of human voice thereby minimizing interference with simultaneous voice traffic on the channel;
    a voice/data signal encoder/decoder (vocoder) for sampling the audio frequency tones and forming digital signals for transmission over the digital wireless telecommunication network; and
    a transmission system for transmitting the digital signals over the audio traffic channel of the digital wireless telecommunication network.

2. A remote communications apparatus according to claim 1 wherein the source for generating digital data comprises a satellite position system receiver.

3. A remote communications apparatus according to claim 2 wherein the satellite position system receiver includes means for providing raw position data received from a satellite position system, and a satellite position system data processor (30) to provide formatted, time-stamped, 3-axis geo-position data responsive to the raw position data.

4. A remote communication apparatus for voice and data communication exclusively over the voice channel of a digital wireless telecommunications network comprising:
    a source for generating digital location data;
    a tone generation module for encoding the digital location data into a series of audio frequency tones;
    a voice/data signal encoder/decoder (vocoder 62) for converting the series of audio frequency tones into a series of digital signals (64) arranged for Transmission over the digital wireless telecommunications network; and
    an RF transceiver coupled to the vocoder for transmitting the digital signals (ever the digital wireless telecommunications network;
    wherein the tone generation module is configured to encode the digital data using audio frequencies specially selected so as to pass through the vocoder and the digital wireless telecommunications network without substantial distortion; and
    further comprising an activation interface for automatically initiating one of a pre-determined set of actions responsive with a corresponding one of a pre-determined set of event triggers.

5. A remote communication apparatus according to claim 4 and wherein the activation interface is responsive to user keypad input.

6. A remote communication apparatus according to claim 4 and wherein the activation interface is responsive to actuation of a selected momentary contact switch.

7. A remote communications apparatus according to claim 4 and wherein the activation interface includes means for decoding one or more audio tones received in the apparatus via the voice channel of the digital wireless telecommunications network and detecting a pre-determined request code from the decoded audio tones, whereby the apparatus responds to a request from a remote location without intervention by a local user.

8. A remote communications apparatus according to claim 4 and wherein the activation interface includes interface circuitry for activating the apparatus to transmit the digital location data in response to any one or more of an environmental sensor output, a physiological monitor output, a pre-determined alarm condition, and a manual input.

9. A remote communications apparatus according to claim 8 and wherein the apparatus further includes a keypad and the manual input to the activation interface includes manual input of one or more key presses to the keypad.

10. A remote communications apparatus according to claim 8 and wherein the environmental sensor output is indicative of a pre-determined environmental condition.

11. A remote communications apparatus according to claim 8 and wherein the physiological monitor output is indicative of a pre-determined physiological condition of the local user.

12. A remote communication apparatus according to claim 4 and wherein the activation interface is responsive to a measurement device.

13. A method for communication control signaling transparently over the voice channel of a digital wireless communication network comprising the steps of:
    providing a wireless remote communication apparatus ("RCA") having a vocoder for transmitting and receiving human voice content over a voice channel of the digital wireless communication network;
    providing a call receiver apparatus ("CRA") also capable of transmitting and receiving human voice content over a voice channel of the digital wireless communication network;

defining one or more control codes reserved for communication control signaling over the voice channel, each control code comprising one or more alpha-numeric characters;

establishing a digital voice channel connection between the RCA and the call receiver apparatus CRA;

in a first one of the RCA and the CRA, selecting one of the communication control codes for transmission to the other one of the RCA and the CRA;

in the first one of the RCA and the CRA, converting the selected control code into an audio tone representation;

in the first one of the RCA and the CRA, formatting the audio tones in a vocoder so as to form digital transmission data;

in the first one of the RCA and the CRA, transmitting the digital transmission data over the digital voice channel connection to the other one of the RCA and the CRA; and in the other one of the RCA and the CRA, detecting the control code to effect control signaling transparently over the voice channel.

14. A method according to claim 13 wherein the defined control codes include a request for assistance, thereby enabling automated response to the request.

15. A method according to claim 13 wherein the converting step includes converting the control code into at least two audio tones having frequencies selected for said formatting in the vocoder without substantial attenuation.

16. A method according to claim 13 wherein the defined control codes include a query for data.

17. A method according to claim 13 wherein the defined control codes include a request to update location data.

18. A method for communicating digital data exclusively over the voice channel of a digital wireless telecommunications network comprising:

providing digital source data;

encoding the digital source dam into a series of audio frequency signals, each signal comprising two or more selected audio frequency tones;

selecting the amplitudes, frequencies and duration of said two or more audio frequency tones by avoiding such amplitudes, frequencies and durations as are attacked as noise by a pre-determined vocoder, so that the selected audio frequency tones will pass through the vocoder without substantial attenuation;

formatting the series of audio frequency signals into a data stream in the vocoder for transmission over the digital wireless telecommunications network; and transmitting the series of digital signals over the digital wireless telecommunications network.

19. A method according to claim 18 further comprising selecting the frequencies of the audio frequency tones so as to avoid frequencies that are characteristic of human voice so that simultaneous voice traffic on the channel does not substantially interfere with the encoded digital data.

20. A method according to claim 18 further comprising receiving and decoding the series of digital signals so as to recover the series of audio frequency signals encoding the digital source data.

* * * * *

UNITED STATES PATENT AND TRADEMARK OFFICE
CERTIFICATE OF CORRECTION

PATENT NO. : 6,144,336
DATED : November 7, 2000
INVENTOR(S) : Dan A. Preston, Joseph D. Preston and James Vroman It is certified that error appears in the above-identified patent and that said Letters Patent is hereby corrected as shown below:

Title page,
Delete the entire abstract and substitute the following abstract:

-- A remote communications apparatus (10) such as a cell telephone is equipped with a satellite position system SPS receiver (26) to acquire location data. The location data is encoded using multiple audio frequency tone encoding (48) such as DTMF for transmission over the voice channel (70) of the telecommunications network (12), including cell CTSS (134) and the PSTN (138) to a call receiver apparatus (14) such as a public safety answering point (PSAP). Location data correction is effected using a fixed antenna (1402) receiving apparatus (1404) and related database (1412), in the network (210) or at the answering point (166) to improve location accuracy. The invention provides advantages of low cost of implementation, improved location accuracy, and transparent signaling of location data so that simultaneous voice communication is uninterrupted. --

Column 3,
Line 3, "Trimnble" should read -- Trimble --.
Line 45, "anumbers" should read -- numbers --.
Lines 48-49, "that as" should read -- as that --.

Column 5,
Line 32, after "billing" insert a period.

Column 7,
Line 54, after "can" insert -- be --.

Column 8,
Line 45, "activate" should read -- activated --.

Column 10,
Line 43, "attach" should read -- attached --.
Line 57, after "data" insert -- is --.

Column 16,
Lines 23-24, after "comprising" delete -- of --.

Column 17,
Line 23, "Cra" should read -- CRA --.

UNITED STATES PATENT AND TRADEMARK OFFICE
CERTIFICATE OF CORRECTION

PATENT NO. : 6,144,336
DATED : November 7, 2000
INVENTOR(S) : Dan A. Preston, Joseph D. Preston and James Vroman It is certified that error appears in the above-identified patent and that said Letters Patent is hereby corrected as shown below:

Column 20,
Line 36, after "data" insert -- is --.

Column 22,
Line 33, after "the" delete the hyphen.

Column 25,
Line 15, "PCSISPS" should read -- PCS/SPS --.
Line 62, "Gyro-Chip™" should read -- Gyro-Chip II™ --.

Column 26,
Line 41, after "antenna" insert a comma.
Line 42, after "altimeter" insert a comma.

Column 27,
Lines 47-48, "fragment" should read -- frequency --.

Column 28,
Line 13, "(ever" should read -- over --.
Line 22, "with" should read -- to --.

Column 30,
Line 7, "dam" should read -- data --.

Signed and Sealed this

Sixth Day of November, 2001

*Attest:*

NICHOLAS P. GODICI
*Attesting Officer*    *Acting Director of the United States Patent and Trademark Office*